United States Patent
Teyeb et al.

(10) Patent No.: US 11,856,619 B2
(45) Date of Patent: Dec. 26, 2023

(54) MAPPING BETWEEN INGRESS AND EGRESS BACKHAUL RLC CHANNELS IN INTEGRATED ACCESS BACKHAUL (IAB) NETWORKS

(71) Applicant: Telefonaktiebolaget LM Ericsson (publ), Stockholm (SE)

(72) Inventors: Oumer Teyeb, Montréal (CA); Gunnar Mildh, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 3 days.

(21) Appl. No.: 17/626,165

(22) PCT Filed: Jul. 14, 2020

(86) PCT No.: PCT/SE2020/050733
§ 371 (c)(1),
(2) Date: Jan. 11, 2022

(87) PCT Pub. No.: WO2021/029804
PCT Pub. Date: Feb. 18, 2021

(65) Prior Publication Data
US 2022/0272774 A1 Aug. 25, 2022

Related U.S. Application Data

(60) Provisional application No. 62/887,429, filed on Aug. 15, 2019.

(51) Int. Cl.
*H04W 76/10* (2018.01)
*H04W 76/20* (2018.01)
(Continued)

(52) U.S. Cl.
CPC ....... *H04W 76/10* (2018.02); *H04W 28/0268* (2013.01); *H04W 40/248* (2013.01);
(Continued)

(58) Field of Classification Search
CPC .......... H04W 28/0268; H04W 40/248; H04W 76/10; H04W 76/11; H04W 76/20;
(Continued)

(56) References Cited

U.S. PATENT DOCUMENTS

| | | |
|---|---|---|
| 2015/0264726 A1 | 9/2015 | Zhu et al. |
| 2018/0270894 A1 | 9/2018 | Park et al. |

(Continued)

FOREIGN PATENT DOCUMENTS

| | | |
|---|---|---|
| CN | 105981431 A | 9/2016 |
| CN | 109803453 A | 5/2019 |
| WO | 2021006789 A2 | 1/2021 |

OTHER PUBLICATIONS

"3GPP TS 29.281 V15.6.0", 3rd Generation Partnership Project; Technical Specification Group Core Network and Terminals; General Packet Radio System (GPRS) Tunnelling Protocol User Plane (GTPv1-U) (Release 15), Sep. 2019, pp. 1-32.

(Continued)

*Primary Examiner* — Pao Sinkantarakorn
*Assistant Examiner* — Pawaris Sinkantarakorn
(74) *Attorney, Agent, or Firm* — Murphy, Bilak & Homiller, PLLC

(57) ABSTRACT

Embodiments includes methods for a centralized unit (CU) in an integrated access backhaul (IAB) network. Such methods include determining a first identifier of a first backhaul radio link control (BH RLC) channel between first and second nodes in the IAB network. The second node is a child node of the first node. Such methods include sending, to the second node, a second request to setup a second BH RLC channel between the second node and a third node in the IAB network. The third node is a child node of the second node, and the second request includes the first identifier for association with the second BH RLC channel. In some (Continued)

embodiments, at least one data radio bearer between a user equipment (UE) and the CU is associated with both the first and second BH RLC channels. Other embodiments include complementary methods for an intermediate node in the IAB network.

22 Claims, 18 Drawing Sheets

(51) Int. Cl.
    *H04W 28/02*     (2009.01)
    *H04W 40/24*     (2009.01)
    *H04W 88/14*     (2009.01)
    *H04W 92/24*     (2009.01)

(52) U.S. Cl.
    CPC ............ *H04W 76/20* (2018.02); *H04W 88/14* (2013.01); *H04W 92/24* (2013.01)

(58) Field of Classification Search
    CPC ... H04W 88/085; H04W 88/14; H04W 92/12; H04W 92/24
    See application file for complete search history.

(56) References Cited

U.S. PATENT DOCUMENTS

| | | | |
|---|---|---|---|
| 2019/0044754 | A1 | 2/2019 | Hampel et al. |
| 2020/0113008 | A1 | 4/2020 | Luo et al. |
| 2021/0051512 | A1* | 2/2021 | Hampel ................ H04W 40/22 |
| 2021/0068177 | A1* | 3/2021 | Liu ...................... H04W 28/0257 |
| 2021/0127380 | A1* | 4/2021 | Liu ....................... H04W 40/22 |
| 2021/0243672 | A1* | 8/2021 | Deshmukh .......... H04W 40/248 |
| 2022/0070732 | A1* | 3/2022 | Wang .................... H04W 40/02 |

OTHER PUBLICATIONS

"3GPP TS 38.423 V15.4.0", 3rd Generation Partnership Project; Technical Specification Group Radio Access Network; NG-RAN; Xn application protocol (XnAP) (Release 15), Jul. 2019, pp. 1-309.
"3GPP TS 38.425 V15.6.0", 3rd Generation Partnership Project; Technical Specification Group Radio Access Network; NG-RAN; NR user plane protocol (Release 15), Jul. 2019, pp. 1-22.
"3GPP TS 38.463 V15.4.0", 3rd Generation Partnership Project; Technical Specification Group Radio Access Network; NG-RAN; E1 Application Protocol (E1AP) (Release 15), Jul. 2019, pp. 1-177.
"3GPP TS 38.473 V15.6.0", 3rd Generation Partnership Project; Technical Specification Group Radio Access Network; NG-RAN; F1 application protocol (F1AP) (Release 15), Jul. 2019, pp. 1-220.
"Backhaul RLC bearer management", 3GPP TSG-RAN WG3 meeting #104; R3-192809; Reno, Nevada, May 13-17, 2019, pp. 1-9.
"Discussion on BH RLC channel configuration in IAB network", 3GPP TSG RAN WG2 Meeting #106; R2-1906576; Reno, USA, May 13-17, 2019, pp. 1-5.
"IAB RLC channel management procedure", 3GPP TSG-RAN WG2 meeting #106; R2-1906076; Reno, USA; revision of R2-1904985, May 13-17, 2019, pp. 1-4.
"3GPP TS 23.203 V16.1.0", 3rd Generation Partnership Project; Technical Specification Group Services and System Aspects; Policy and charging control architecture (Release 16), Jun. 2019, pp. 1-263.
"3GPP TS 23.401 V16.3.0", 3rd Generation Partnership Project; Technical Specification Group Services and System Aspects; General Packet Radio Service (GPRS) enhancements for Evolved Universal Terrestrial Radio Access Network (E-UTRAN) access (Release 16), Jun. 2019, pp. 1-423.
"3GPP TS 38.414 V15.2.0", 3rd Generation Partnership Project; Technical Specification Group Radio Access Network; NG-RAN; NG data transport (Release 15), Jul. 2019, pp. 1-8.
"3GPP TS 36.423 V15.5.0", 3rd Generation Partnership Project; Technical Specification Group Radio Access Network; Evolved Universal Terrestrial Radio Access Network (E-UTRAN); X2 application protocol (X2AP) (Release 15), Mar. 2019, pp. 1-414.
"3GPP TS 38.401 V15.6.0", 3rd Generation Partnership Project; Technical Specification Group Radio Access Network; NG-RAN; Architecture description (Release 15), Jul. 2019, pp. 1-46.
"3GPP TS 38.321 V15.6.0", 3rd Generation Partnership Project; Technical Specification Group Radio Access Network; NR; Medium Access Control (MAC) protocol specification (Release 15), Jun. 2019, pp. 1-78.
"3GPP TS 38.331 V15.6.0", 3rd Generation Partnership Project; Technical Specification Group Radio Access Network; NR; Radio Resource Control (RRC) protocol specification (Release 15), Jun. 2019, pp. 1-519.
"3GPP TR 38.874 V16.0.0", 3rd Generation Partnership Project; Technical Specification Group Radio Access Network; NR; Study on Integrated Access and Backhaul; (Release 16), Dec. 2018, pp. 1-111.
"3GPP TR 38.806 V15.0.0", 3rd Generation Partnership Project; Technical Specification Group Radio Access Network; Study of separation of NR Control Plane (CP) and User Plane (UP) for split option 2; (Release 15), Dec. 2017, pp. 1-22.
"3GPP TR 38.874 V0.2.1", 3rd Generation Partnership Project; Technical Specification Group Radio Access Network; Study on Integrated Access and Backhaul; (Release 15), May 2018, pp. 1-19.
"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.
"3GPP TS 33.401 V15.8.0", 3rd Generation Partnership Project; Technical Specification Group Services and System Aspects; 3GPP System Architecture Evolution (SAE); Security architecture (Release 15), Jun. 2019, pp. 1-163.
"Recovery from Link Failure in IAB Networks", 3GPP TSG RAN WG3 Meeting #103, R3-190363, Athens, Greece, Feb. 25-Mar. 1, 2019, pp. 1-5.
"Bearer Mapping—further details", 3GPP TSG RAN WG2 Meeting #106, R2-1906348, Reno, U.S.A., May 13-17, 2019, pp. 1-5.
"Open issues for BAP-layer bearer mapping", 3GPP TSG-RAN WG2 Meeting #106, R2-1906084, Reno, USA, May 13-17, 2019, pp. 1-4.
"3GPP TS 23.501 V15.5.0", 3rd Generation Partnership Project; Technical Specification Group Services and System Aspects; System Architecture for the 5G System; Stage 2 (Release 15), Mar. 2019, pp. 1-241.
"IAB bearer mapping decision and configuration", 3GPP TSG-RAN WG2#106, R2-1906069, Revision of R2-1905103, Reno, US, May 13-17, 2019, pp. 1-4.
"IP routing between IAB and operator network", 3GPP TSG-RAN WG2 Meeting #105, R2-1903582, Xi'an, China, Apr. 8-12, pp. 1-5, Year : 2019.
"New WID: Integrated Access and Backhaul for NR", 3GPP TSG RAN Meeting #82 RP-182882, Sorrento, Italy, Dec. 10-13, 2018, pp. 1-7.
"QoS Mapping to Backhaul Bearers in IAB Networks", 3GPP TSG RAN WG3 Meeting #103bis R3-191358 Xi'an, P.R. China, Apr. 8-12, 2019, pp. 1-3.
"IAB bearer mapping decisions", 3GPP TSG-RAN WG2#101bis, R3-185999, Chengdu, China, Oct. 8-12, 2018, pp. 1-6.

\* cited by examiner

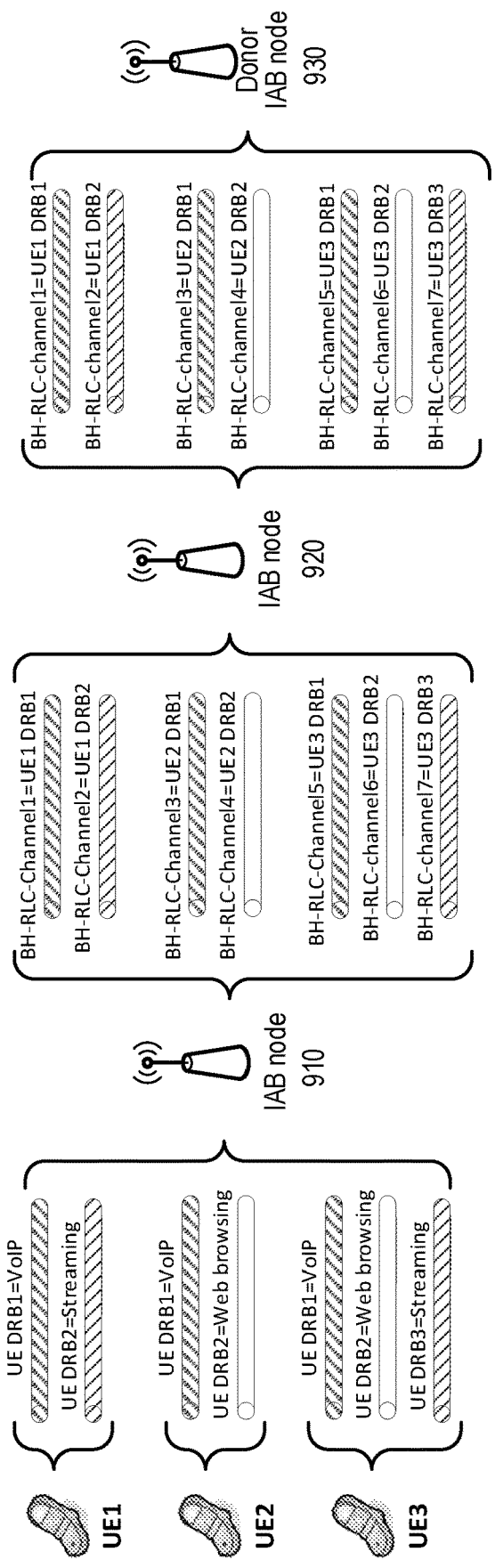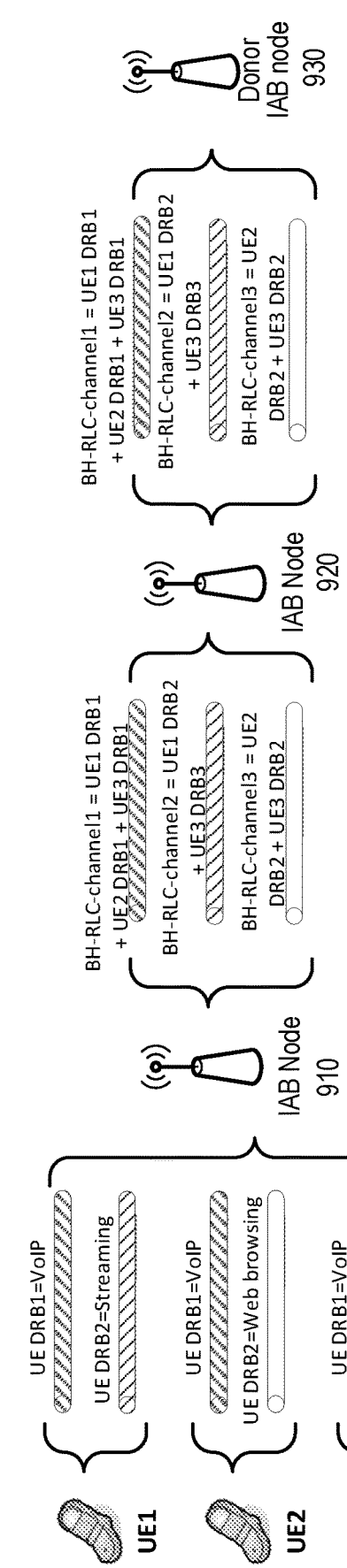
FIG. 9
FIG. 10

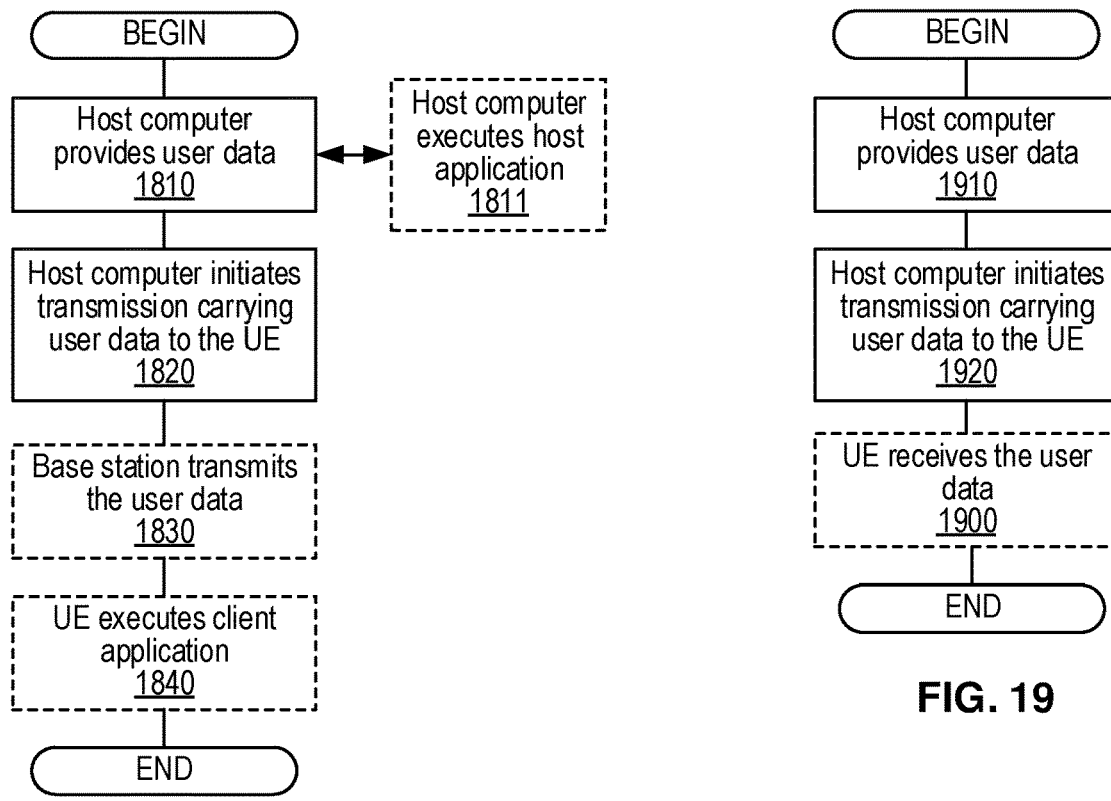
FIG. 18
FIG. 19
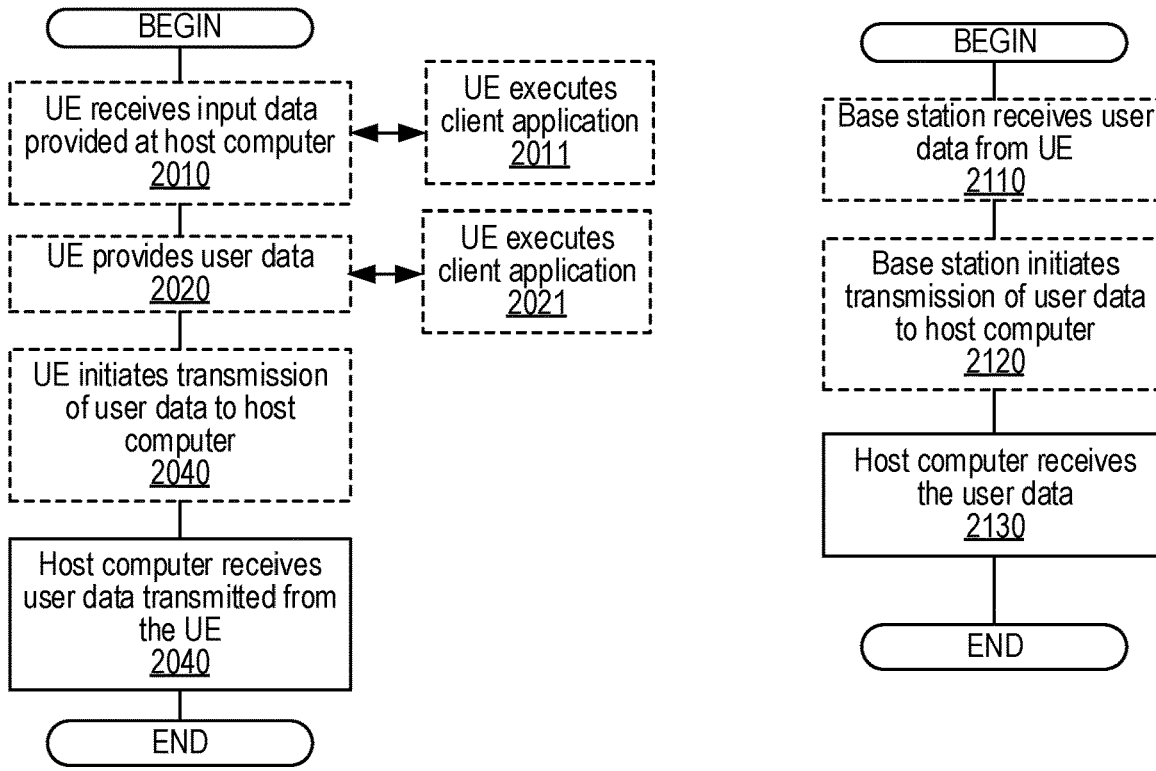
FIG. 20
FIG. 21

MAPPING BETWEEN INGRESS AND EGRESS BACKHAUL RLC CHANNELS IN INTEGRATED ACCESS BACKHAUL (IAB) NETWORKS

TECHNICAL FIELD

The present application relates generally to the field of wireless communication networks, and more specifically to integrated access backhaul (IAB) networks in which the available wireless communication resources are shared between user access to the network and backhaul of user traffic within the network (e.g., to/from a core network).

INTRODUCTION

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases.

FIG. 1 illustrates a high-level view of the 5G network architecture, consisting of a Next Generation RAN (NG-RAN) 199 and a 5G Core (5GC) 198. NG-RAN 199 can include one or more gNodeB's (gNBs) connected to the 5GC via one or more NG interfaces, such as gNBs 100, 150 connected via interfaces 102, 152, respectively. More specifically, gNBs 100, 150 can be connected to one or more Access and Mobility Management Functions (AMFs) in the 5GC 198 via respective NG-C interfaces. Similarly, gNBs 100, 150 can be connected to one or more User Plane Functions (UPFs) in 5GC 198 via respective NG-U interfaces. Various other network functions (NFs) can be included in the 5GC 198, including Session Management Function(s) (SMF).

Although not shown, in some deployments 5GC 198 can be replaced by an Evolved Packet Core (EPC), which conventionally has been used together with a Long-Term Evolution (LTE) Evolved UMTS RAN (E-UTRAN). In such deployments, gNBs 100, 150 can connect to one or more Mobility Management Entities (MMEs) in EPC 198 via respective S1-C interfaces. Similarly, gNBs 100, 150 can connect to one or more Serving Gateways (SGWs) in EPC via respective NG-U interfaces.

In addition, the gNBs can be connected to each other via one or more Xn interfaces, such as Xn interface 140 between gNBs 100 and 150. The radio technology for the NG-RAN is often referred to as "New Radio" (NR). With respect the NR interface to UEs, each of the gNBs can support frequency division duplexing (FDD), time division duplexing (TDD), or a combination thereof.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region" which is defined in 3GPP TS 23.501 (v15.5.0). If security protection for CP and UP data on TNL of NG-RAN interfaces is supported, NDS/IP (3GPP TS 33.401 (v15.8.0)) shall be applied.

The NG RAN logical nodes shown in FIG. 1 (and described in 3GPP TS 38.401 (v15.6.0) and 3GPP TR 38.801 (v14.0.0)) include a Central Unit (CU or gNB-CU) and one or more Distributed Units (DU or gNB-DU). For example, gNB 100 includes gNB-CU 110 and gNB-DUs 120 and 130. CUs (e.g., gNB-CU 110) are logical nodes that host higher-layer protocols and perform various gNB functions such controlling the operation of DUs. A DU (e.g., gNB-DUs 120, 130) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to one or more gNB-DUs over respective F1 logical interfaces, such as interfaces 122 and 132 shown in FIG. 1. However, a gNB-DU can be connected to only a single gNB-CU. The gNB-CU and connected gNB-DU(s) are only visible to other gNBs and the 5GC as a gNB. In other words, the F1 interface is not visible beyond gNB-CU.

Furthermore, the F1 interface between the gNB-CU and gNB-DU is specified and/or based on the following general principles:

F1 is an open interface;
F1 supports the exchange of signalling information between respective endpoints, as well as data transmission to the respective endpoints;
from a logical standpoint, F1 is a point-to-point interface between the endpoints (even in the absence of a physical direct connection between the endpoints);
F1 supports control plane and user plane separation into respective F1-AP protocol and F1-U protocol (also referred to as NR User Plane Protocol), such that a gNB-CU may also be separated in CP and UP;
F1 separates Radio Network Layer (RNL) and Transport Network Layer (TNL);
F1 enables exchange of user equipment (UE) associated information and non-UE associated information;
F1 is defined to be future proof with respect to new requirements, services, and functions;
A gNB terminates X2, Xn, NG and S1-U interfaces and, for the F1 interface between DU and CU, utilizes the F1-AP protocol that is defined in 3GPP TS 38.473 (v15.6.0).

In addition, the F1-U protocol is used to convey control information related to the user data flow management of data radio bearers, as defined in 3GPP TS 38.425 (v15.6.0). The F1-U protocol data is conveyed by the GTP-U protocol, more specifically by the "RAN Container" GTP-U extension header as defined in 3GPP TS 29.281 (v15.6.0). In other words, the GTP-U protocol over user datagram protocol (UDP) over Internet Protocol (IP) carries data streams on the F1 interface. A GTP-U "tunnel" between two nodes is identified in each node by tunnel endpoint identifier (TEID), an IP address, and a UDP port number. A GTP-U tunnel is necessary to enable forwarding packets between GTP-U entities.

Furthermore, a CU can host protocols such as RRC and PDCP, while a DU can host protocols such as RLC, MAC and PHY. Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some exemplary embodiments, the CU can host RRC and PDCP, where PDCP is assumed to handle both UP traffic and CP traffic. Other arrangements of hosting certain protocols in the CU and certain others in the DU are also possible.

Centralized control plane protocols (e.g., PDCP-C and RRC) can be hosted in a different CU than centralized user plane protocols (e.g., PDCP-U). In particular, it has also been agreed in 3GPP RAN3 Working Group (WG) to support a separation of the gNB-CU into a CU-CP function (including RRC and PDCP for signaling radio bearers) and CU-UP function (including PDCP for user plane). FIG. 2 shows an exemplary gNB architecture that includes two DUs, a CU-CP, and one or more CU-UPs. As shown in FIG. 2, a single CU-CP can be associated with multiple CU-UPs in a gNB. The CU-CP and CU-UP communicate with each other using the E1-AP protocol over the E1 interface, as specified in 3GPP TS 38.463 (v15.4.0). Furthermore, the F1 interface between CU and DU (see FIG. 1) is functionally split into F1-C between DU and CU-CP and F1-U between DU and CU-UP. Three deployment scenarios for the split gNB architecture shown in FIG. 2 are defined in 3GPP TR 38.806 (v15.0.0):

Scenario 1: CU-CP and CU-UP centralized;
Scenario 2: CU-CP distributed and CU-UP centralized;
Scenario 3: CU-CP centralized and CU-UP distributed.

Densification via the deployment of more and more base stations (e.g., macro or micro base stations) is one of the mechanisms that can be employed to satisfy the increasing demand for bandwidth and/or capacity in mobile networks, which is mainly driven by the increasing use of video streaming services. Due to the availability of more spectrum in the millimeter wave (mmw) band, deploying small cells that operate in this band is an attractive deployment option for these purposes. However, the normal approach of connecting the small cells to the operator's backhaul network with optical fiber can end up being very expensive and impractical. Employing wireless links for connecting the small cells to the operator's network is a cheaper and more practical alternative.

One such approach is an integrated access backhaul (IAB) network where the operator can repurpose radio resources conventionally used for network access (e.g., by wireless devices or UEs) for connecting small cells to the operator's backhaul network. IAB was studied earlier in the scope of 3GPP Long Term Evolution (LTE) Rel-10. That work produced an architecture based on a Relay Node (RN) with the functionality of an LTE eNB and UE modem. The RN is connected to a donor eNB which has a S1/X2 proxy functionality hiding the RN from the rest of the network. That architecture enabled the Donor eNB to also be aware of the UEs behind the RN and hide any UE mobility between Donor eNB and Relay Node on the same Donor eNB from the CN. During the Rel-10 study, other architectures were also considered including, e.g., where the RNs are more transparent to the Donor gNB and allocated a separate stand-alone P/S-GW node.

Similar IAB options can also be considered for 5G/NR networks. One difference compared to LTE is the gNB-CU/DU split architecture described above, which separates time critical RLC/MAC/PHY protocols from less time critical RRC/PDCP protocols. A similar split can also be applied in IAB networks. Other IAB-related differences in NR as compared to LTE are support of multiple hops and support of redundant paths.

To support quality of service (QoS) prioritization of different end user traffic (e.g., from UEs) in IAB networks, it is necessary the end user traffic to different backhaul (BH) RLC channels for each hop in the IAB network (e.g., between nodes). Each BH RLC channel is associated with a logical channel ID (LCID). In the CU-DU split architecture, various messages can be used by the CU to setup and modify UE bearers. The DU, upon the reception of any of these message, respond with a list of the bearers that it was able to setup, including LCID(s) assigned to these bearers. When applied to IAB networks with multiple hops, however, this bearer setup procedure can incur considerable delay, which can degrade end-user experience.

SUMMARY

Accordingly, exemplary embodiments of the present disclosure address these and other difficulties in integrating IAB nodes into a wireless network, thereby enabling the otherwise-advantageous deployment of IAB solutions.

Some embodiments of the present disclosure include methods (e.g., procedures) for a centralized unit (CU) in an IAB network. These exemplary methods can include determining a first identifier of a first backhaul radio link control (BH RLC) channel between first and second nodes in the IAB network. The second node is a child node of the first node. These exemplary methods can also include sending, to the second node, a second request to setup a second BH RLC channel between the second node and a third node in the IAB network. The third node is a child node of the second node. The second request can include the first identifier for association with the second BH RLC channel.

In some embodiments, at least one data radio bearer (DRB) between a user equipment (UE) and the CU can be associated with both the first and second BH RLC channels. In some embodiments, the second request can be a context setup request or context modification request associated with the UE and the first identifier can be a logical channel identifier (LCID).

In some embodiments, these exemplary methods can also include sending, to the first node, a first request to setup the first BH RLC channel. In some of these embodiments, the determining operations can include receiving the first identifier from the first node in response to the first request to setup the first BH RLC channel. For example, the first identifier can be received from a distributed unit (DU) associated with the first node, and the second request can be sent to a DU associated with the second node.

In other of these embodiments, the first request can include the first identifier. In such embodiments, the determining operations can include selecting the first identifier according to one of the following:

from a pool of available BH RLC identifiers;
same as an identifier of a further BH RLC channel, wherein the further BH RLC channel and the first BH RLC channel are associated with the same data radio bearer (DRB) between a user equipment (UE) and the CU; or
based on quality-of-service (QoS) parameters associated with the first BH RLC channel.

In such embodiments, the second request can be sent to the second node without waiting for a response from the first node to the first request.

In some embodiments, these exemplary methods can also include determining a second identifier of the second BH RLC channel, and sending, to the third node (i.e., child of the second node), a third request to setup a third BH RLC channel between the third node and a fourth node in the IAB network. The fourth node is a child node of the third node. The third request can include the second identifier for association with the third BH RLC channel.

In some of these embodiments, the determining operations can include receiving the second identifier from the second node in response to the second request. In other of these embodiments, the second request can include the second identifier. In such embodiments, the determining operations can include selecting the second identifier according to one of the following:
- from a pool of available BH RLC identifiers;
- same as the first identifier;
- same as an identifier of a further BH RLC channel, wherein the further BH RLC channel and the second BH RLC channel are associated with the same DRB between a UE and the CU; or
- based on QoS parameters associated with the second BH RLC channel.

Other embodiments of the present disclosure include methods (e.g., procedures) for an intermediate node in an IAB network. These exemplary methods can include determining a first identifier of a first backhaul radio link control (BH RLC) channel between the intermediate node and a parent node (e.g., of the intermediate node) in the IAB network. These exemplary methods can also include assigning a second identifier to the second BH RLC channel between the intermediate node and a child node in the IAB network. These exemplary methods can also include associating the first identifier and the second identifier with a data radio bearer (DRB) between a user equipment (UE) and the CU.

In some embodiments, these exemplary methods can also include receive a data packet, associated with the DRB, via one of the first and second BH RLC channels; and, based on associating the first and second identifiers with the DRB, forwarding the data packet for transmission via the other of the first and second BH RLC channels. In some of these embodiments, the intermediate node can include a mobile terminal (MT) part and a distributed unit (DU) part. In such embodiments, the data packet can be received by one of the MT and DU parts and can be forwarded for transmission by the other of the MT and DU parts.

In some embodiments, these exemplary methods can also include receiving, from the CU, a request to setup the second BH RLC channel between the intermediate node and the child node. For example, the request can be a context setup request or context modification request associated with the UE and the first identifier can be a logical channel identifier (LCID).

In some of these embodiments, the determining operations can include receiving the first identifier in the request to setup the second BH RLC channel.

The assigning operations can vary depending on embodiment. For example, the assigning operations can include receiving the second identifier in the request to setup the second BH RLC channel. As another example, the assigning operations can include selecting the second identifier according to one of the following:
- from a pool of available BH RLC identifiers;
- same as the first identifier;
- same as an identifier of a further BH RLC channel associated with the DRB; or
- based on quality-of-service (QoS) parameters associated with the second BH RLC channel.

In other embodiments, the determining operations can include selecting the first identifier according to one of the following:
- from a pool of available BH RLC identifiers;
- same as an identifier of a further BH RLC channel associated with the DRB; or
- based on QoS parameters associated with the first BH RLC channel.

In some embodiments, these exemplary methods can also include sending, to the CU, a response to the request to setup the second BH RLC channel, wherein the response includes the second identifier.

Other embodiments include network nodes (e.g., CUs, IAB nodes, etc. or components thereof) configured to perform operations corresponding to any of the exemplary methods described herein. Other exemplary embodiments include non-transitory, computer-readable media storing computer-executable instructions that, when executed by processing circuitry, configure such network nodes to perform operations corresponding to any of the exemplary methods described herein.

These and other objects, features, and advantages of the present disclosure will become apparent upon reading the following Detailed Description in view of the Drawings briefly described below.

BRIEF DESCRIPTION OF THE DRAWINGS

FIG. 9 shows an example of one-to-one (1:1) mapping between UE data radio bearers (DRBs) and backhaul radio link control (BH RLC) Channels.

FIG. 10 shows an example of many-to-one (N:1) mapping between UE DRBs and BH RLC channels.

FIGS. 18-21 are flow diagrams of exemplary methods for transmission and/or reception of user data, according to various exemplary embodiments of the present disclosure.

DETAILED DESCRIPTION

Figure 1:
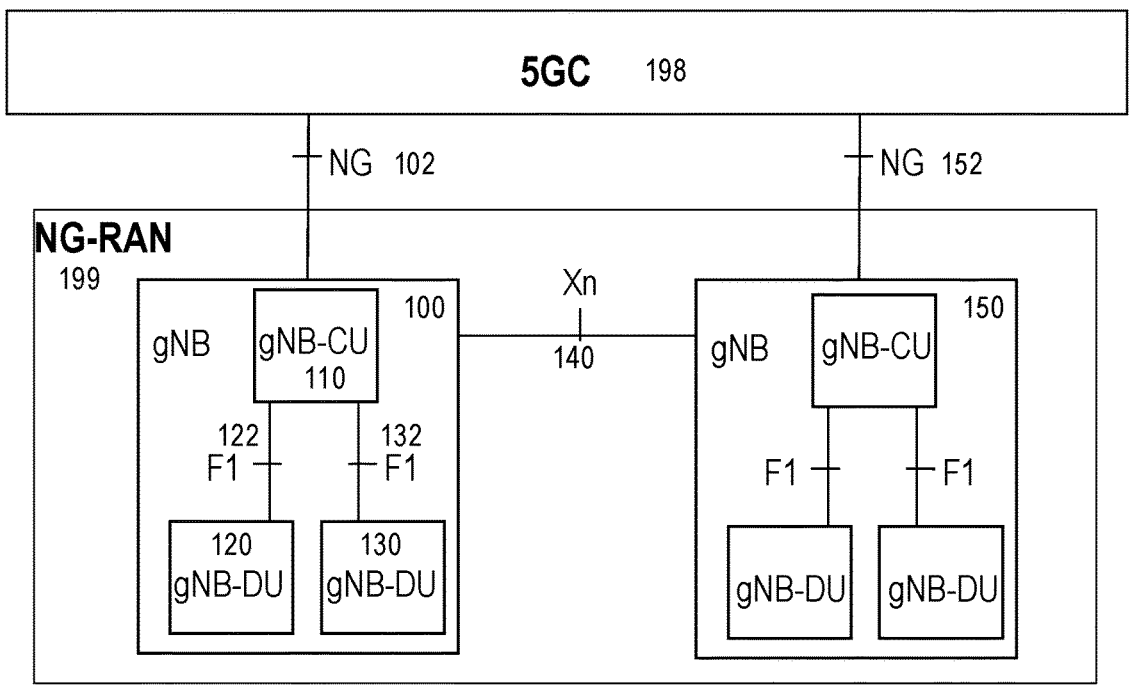
FIG. 1 shows a high-level view of the 5G network architecture, including split central unit (CU)-distributed unit (DU) split architecture of gNBs.

Exemplary embodiments briefly summarized above will now be described more fully with reference to the accompanying drawings. These descriptions are provided by way of example to explain the subject matter to those skilled in the art and should not be construed as limiting the scope of the subject matter to only the embodiments described herein. More specifically, examples are provided below that illustrate the operation of various embodiments according to the advantages discussed above.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Furthermore, the following terms are used throughout the description given below:

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node (or component thereof such as MT or DU), a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, mobile terminals (MTs), etc.

Radio Node: As used herein, a "radio node" can be either a "radio access node" (or equivalent term) or a "wireless device."

Network Node: As used herein, a "network node" is any node that is either part of the radio access network (e.g., a radio access node or equivalent term) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Node: As used herein, the term "node" (without any prefix) can be any type of node that is capable of operating in or with a wireless network (including a RAN and/or a core network), including a radio access node (or equivalent term), core network node, or wireless device.

Parent Node: As used herein, the term "parent node" (or "parent IAB node") refers to a node immediately upstream from a particular IAB node in an IAB network (e.g., an IAB node one hop closer to a donor gNB). Even so, a parent node may be only one of the nodes upstream from the particular IAB node in the network, e.g., if there are multiple hops to a donor gNB.

Child node: As used herein, the term "child node" (or "child IAB node") refers to a node immediately downstream from a particular IAB node (e.g., an IAB node one hop further from a donor gNB) in an IAB network. Even so, a child node may be only one of the nodes downstream from the particular IAB node in the network, e.g., if there are multiple hops to served UEs.

Note that the description given herein focuses on a 3GPP cellular communications system and, as such, 3GPP terminology or terminology similar to 3GPP terminology is generally used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

As briefly mentioned above, in the CU-DU split architecture, various messages can be used by the CU to setup and modify UE bearers. The DU, upon the reception of any of these messages, respond with a list of the bearers that it was able to setup, including LCID(s) assigned to these bearers. When applied to IAB networks with multiple hops, however, this bearer setup procedure can incur considerable delay, which can degrade end-user experience. This is discussed in more detail below, following an explanation of IAB network architecture and protocols.

Figure 3:
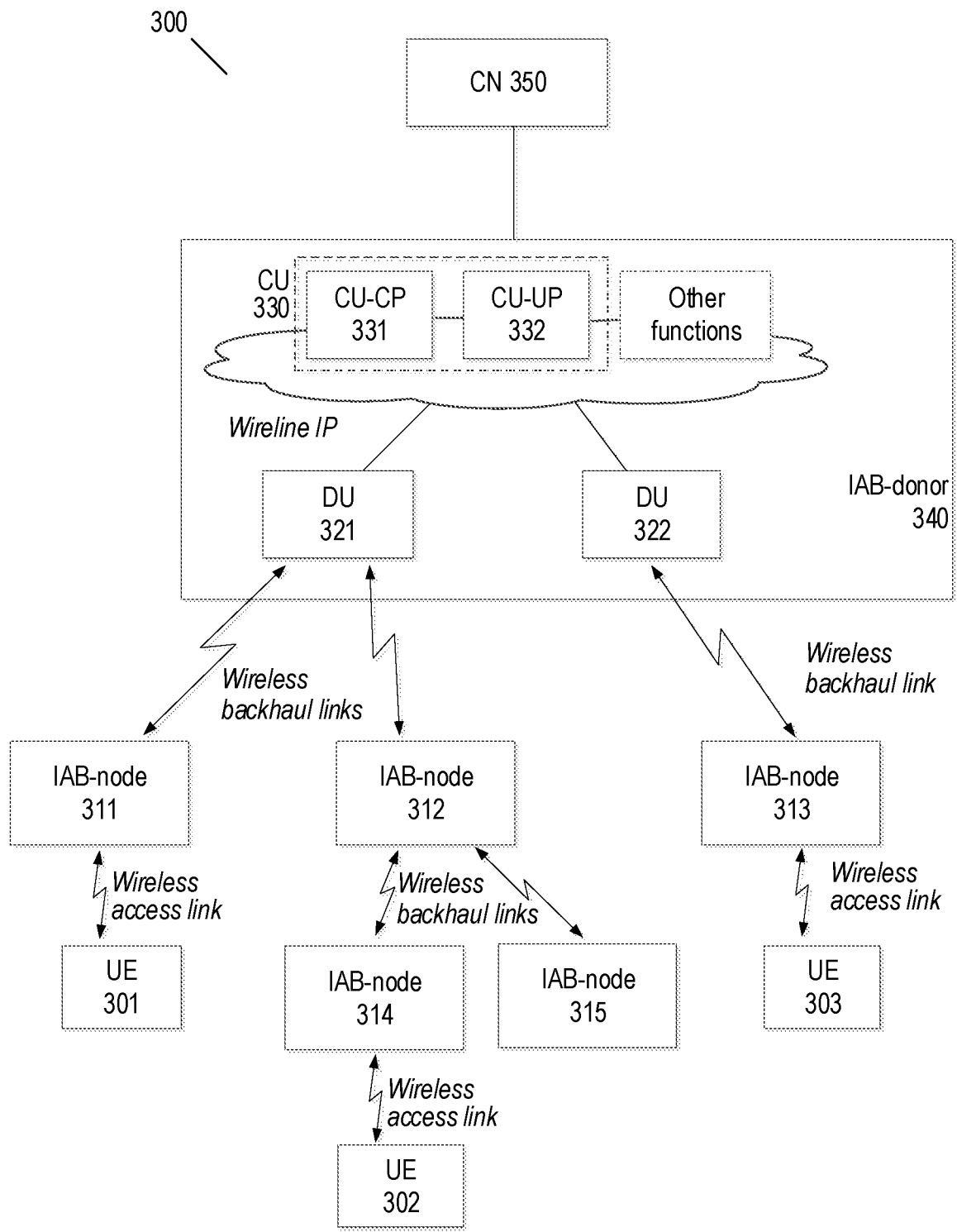
FIG. 3 shows a reference diagram for an integrated access backhaul (IAB) network in standalone mode, as further explained in 3GPP TR 38.874.

FIG. 3 shows a reference diagram for an IAB network (300) in standalone mode, as further explained in 3GPP TR 38.874 (version 0.2.1). The IAB network shown in FIG. 3 includes one IAB-donor 340 and multiple IAB-nodes 311-315, all of which can be part of a radio access network (RAN 399) such as an NG-RAN. IAB donor 340 includes DUs 321, 322 connected to a CU 330, which is represented by functions CU-CP 331 and CU-UP 332. IAB donor 340 can communicate with core network (CN) 350 via the CU functionality shown.

Each of the IAB nodes 311-315 connects to the IAB-donor via one or more wireless backhaul links (also referred to herein as "hops"). More specifically, the Mobile-Termination (MT, also referred to as "mobile terminal") function of each IAB-node 311-315 terminates the radio interface layers of a wireless backhaul link towards a corresponding "upstream" (or "northbound") DU function of a parent node. This MT functionality is similar to functionality that enables UEs to access the IAB network and, in fact, has been specified by 3GPP as part of the Mobile Equipment (ME).

In the context of FIG. 3, upstream DUs can include either DU 321 or 322 of IAB donor 340 and, in some cases, a DU function of an intermediate IAB node that is "downstream" (or "southbound") from IAB donor 340. As a more specific example, IAB-node 314 is downstream from IAB-node 312 and DU 321, IAB-node 312 is upstream from IAB-node 314 but downstream from DU 321, and DU 321 is upstream from IAB-nodes 312 and 314. The DU functionality of IAB nodes 311-315 also terminates the radio interface layers of wireless access links towards UEs (e.g., for network access via the DU) and wireless backhaul links towards corresponding upstream MT functions of respective parent IAB nodes.

As shown in FIG. 3, IAB-donor 340 can be treated as a single logical node that comprises a set of functions such as gNB-DUs 321-322, gNB-CU-CP 331, gNB-CU-UP 332, and possibly other functions. In some deployments, the IAB-donor can be split according to these functions, which can all be either co-located or non-co-located as allowed by the 3GPP NG-RAN architecture. Also, some of the functions presently associated with the IAB-donor can be moved outside of the IAB-donor if such functions do not perform IAB-specific tasks.

In general, the 3GPP IAB specifications reuse existing functions and interfaces defined in NR. In particular, the existing MT, gNB-DU, gNB-CU, UPF, AMF, and SMF as well as the corresponding interfaces NR Uu (between MT and gNB), F1, NG, X2 and N4 are used as baseline for the IAB architectures. For example, each IAB-node DU connects to the IAB-donor CU using a modified form of F1, which is referred to as F1*. The user-plane portion of F1* (referred to as "F1*-U") runs over RLC channels on the wireless backhaul between the MT on the serving IAB-node and the DU on the IAB donor.

Figure 4:
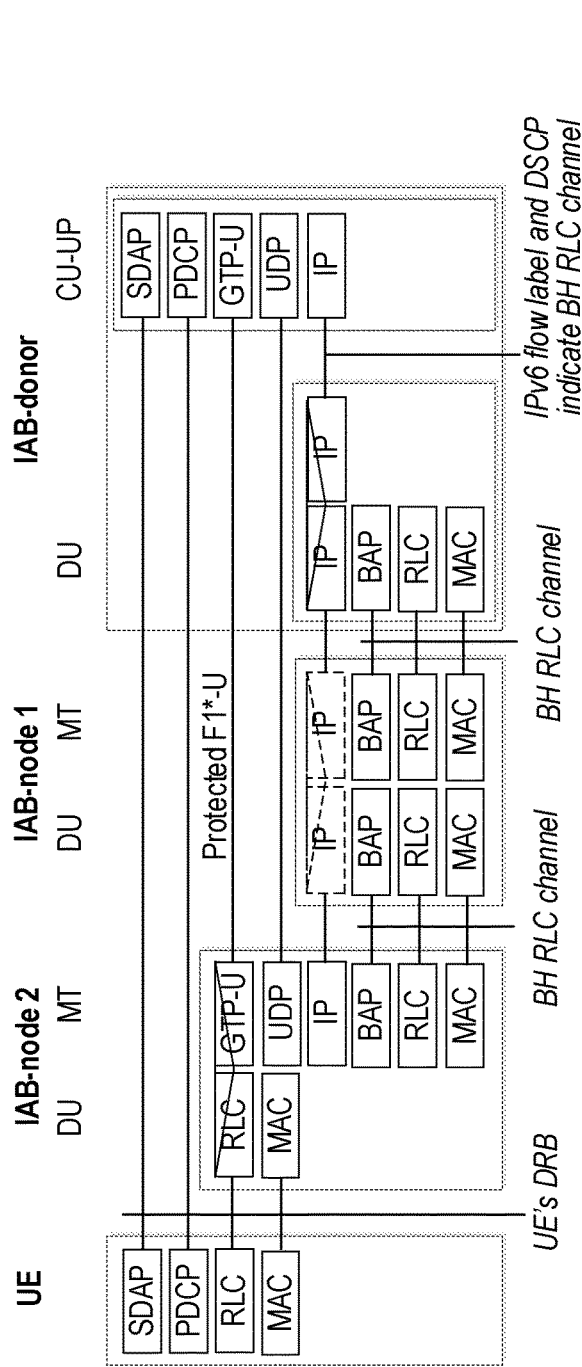
FIG. 4 shows an exemplary IAB user plane (UP) protocol stack.

FIGS. 4 and 5 show exemplary IAB user plane (UP) and control plane (CP) protocol stacks, respectively, as defined in 3GPP Rel-16. As shown in these figures, the chosen protocol stacks reuse the current CU-DU split specification in 3GPP Rel-15, where the full user plane F1-U (GTP-U/UDP/IP) is terminated at the IAB node (e.g., like a normal DU) and the full control plane F1-C(F1-AP/SCTP/IP) is also terminated at the IAB node (also like a normal DU). In the above cases, Network Domain Security (NDS) has been employed to protect both UP and CP traffic: IPsec for UP, datagram transport layer security (DTLS) for CP. IPsec could also be used for the CP protection instead of DTLS.

A new Backhaul Adaptation Protocol (BAP) layer has been introduced in the IAB nodes and the IAB donor. The BAP layer routes packets to the appropriate downstream/upstream node. The BAP layer also maps UE bearer data to the proper backhaul RLC channel (also referred to herein as "backhaul RLC bearers"), as well as between ingress and egress backhaul RLC channels in intermediate IAB nodes. The BAP layer can be configured to satisfy the end to end QoS requirements of bearers.

As shown in FIG. 4, both the IAB-donor and the UE will always have PDCP, RLC, and MAC layers, while the intermediate IAB-nodes will only have RLC and MAC layers. Each PDCP transmitter entity in FIG. 4 receives PDCP service data units (SDUs) from higher layers and assigns each SDU a Sequence Number before delivery to the RLC layer. A discardTimer is also started when a PDCP SDU is received. When the discardTimer expires, the PDCP SDU is discarded and a discard indication is sent to lower layers. In response, RLC will discard a corresponding RLC SDU if possible.

Each PDCP receiver entity in FIG. 4 starts a reordering timer (e.g., t-reordering) when it receives packets in out-of-order. When t-reordering expires, the PDCP entity updates the variable RX_DELIV which indicates the value of the first PDCP SDU not delivered to the upper layers (e.g., the lower side of a receiving window).

Each RLC transmitter entity in FIG. 4 associates a sequence number with each SDU received from higher layers (e.g., PDCP). In acknowledged mode (AM) operation, the RLC transmitter can set a poll bit to request the RLC receiver to transmit a status report on RLC PDUs sent by the transmitter. Upon setting the poll bit, the RLC transmitter starts a timer (e.g., t-pol/Retransmit). Upon expiration of this timer, the RLC transmitter can again set again the poll bit and can retransmit those PDUs that were awaiting acknowledgement.

On the other hand, an RLC receiver will start a timer (e.g., t-reassembly) when RLC PDUs are received out of sequence. A missing PDU can be determined based on a gap in RLC sequence numbers. This function is similar to the t-reordering timer in PDCP. When t-reassembly expires during AM operation, the RLC receiver will transmit a status report to trigger a retransmission by the RLC transmitter.

Once a MAC transmitter entity in FIG. 4 receives SDUs from higher layers (e.g., RLC) for transmission, it can request a resource grant for transmitting the corresponding MAC PDUs. The MAC transmitter can request a resource grant by sending either a scheduling request (SR) or a buffer status report (BSR).

Figure 5A:
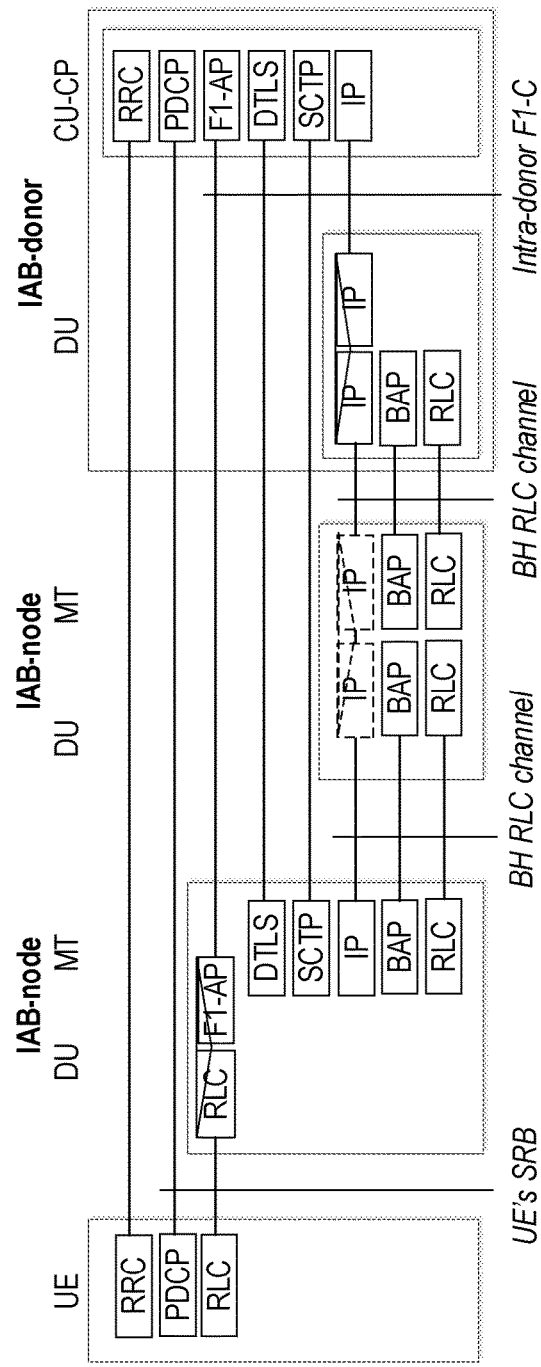
FIGS. 5A-C show various exemplary IAB control plane (CP) protocol stacks.
Figure 5B:
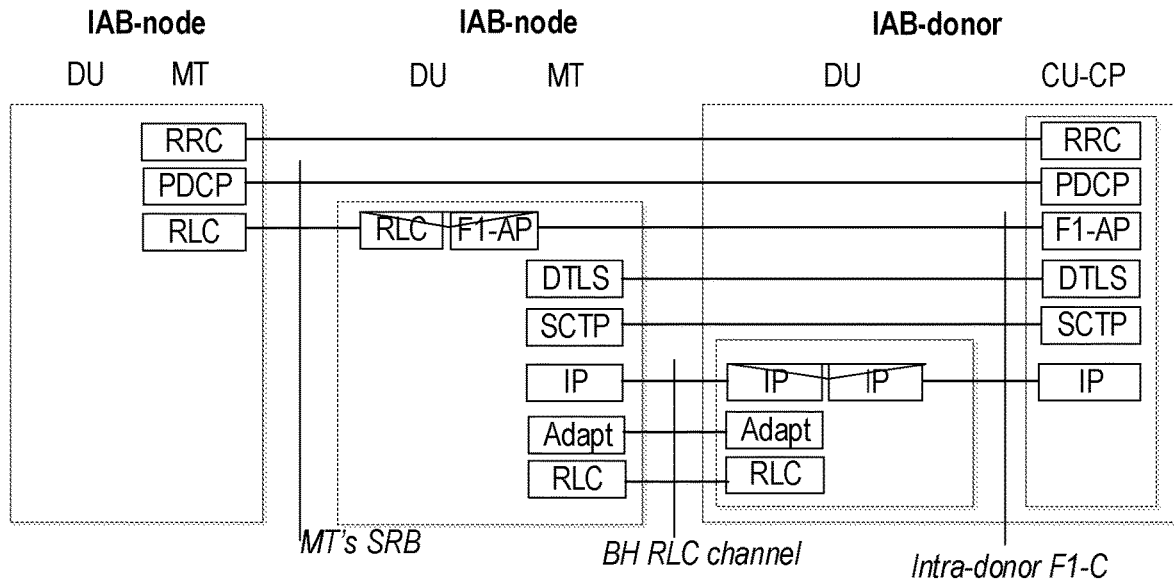
Figure 5C:
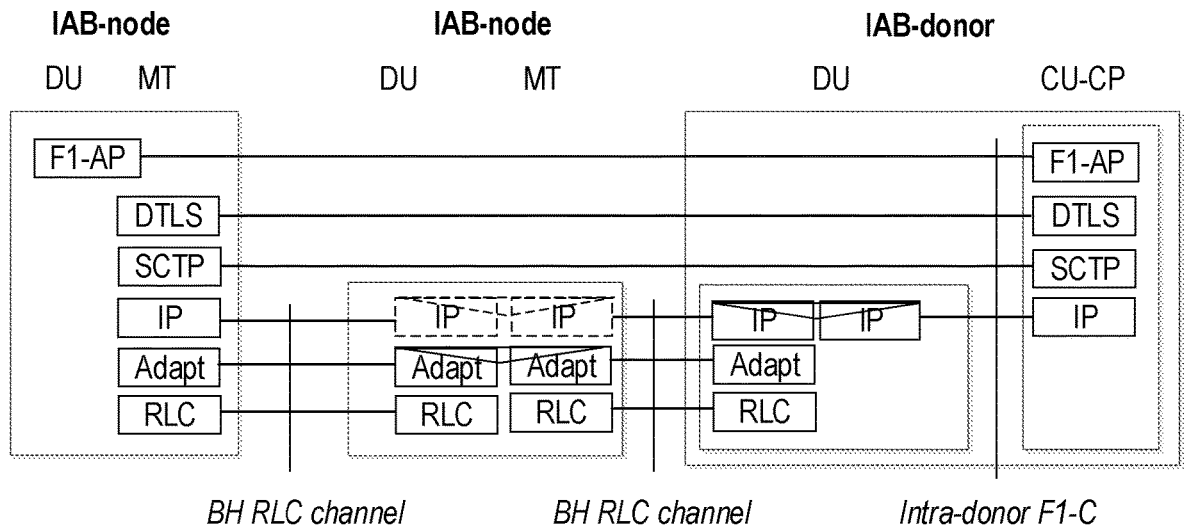

FIGS. 5A-5C show three different exemplary CP protocol stacks used in the 3GPP Rel-16 IAB network architecture. FIG. 5A shows the CP between the IAB-donor CU and a UE, which at the highest level consists of the RRC protocol carried by PDCP. Beneath these higher layers is RLC between UE and serving IAB-node DU, as well as F1-AP between serving IAB-node MT and the IAB-donor CU.

FIG. 5B shows the CP between the IAB-donor CU and an IAB-node MT, which is functionally very similar to the CP between the IAB-donor CU and the UE shown in FIG. 5A. FIG. 5C shows the CP between the IAB-donor CU and an IAB-node DU, which utilizes F1-AP at the highest level. This traffic is carried over DTLS/SCTP/IP between the IAB-donor CU and the corresponding IAB-node MT.

Setup and configuration (collectively referred to as "integration") are the first steps in the operation of the IAB node. An exemplary integration procedure includes the following operations.

1. MT Setup
   a. MT selects parent node (procedure is FFS).
   b. MT authenticates with AMF (Uu procedures)
   c. AMF authorizes MT at gNB (signaling agreed at RAN3 #103)
   d. gNB establishes SRBs with MT (Uu procedures)
   e. gNB may establish DRBs and PDU session with MT (Uu procedures; if this is necessary is FFS). A PDU session may be used for OAM connectivity
   The IAB node will first connect via its MT functionality using RRC setup procedure. After RRC connection setup, the MT functionality of the IAB node could perform NAS-level registration and authentication, but no PDU session establishment is required. After the NAS registration, UE context for the IAB node can be created in the RAN (without any PDU session resources). In this way, there is no need to support any SMF/UPF functionality for the IAB nodes. NAS Rel-15 already separates the NAS registration from the PDU session establishment, making it possible to only perform registration without setting up PDU sessions, as well as setting up a UE context in RAN without PDU session resources.

2. Backhaul Setup
   a. Establishment of BH RLC channel between IAB-node MT and parent node.
      RAN2 decided that this configuration is done by CU-CP (e.g. using RRC).
      MT's CU-CP needs to know that MT belongs to an IAB node and not a UE, which it may derive, e.g., from MT authorization (agreed at RAN3 #103).
      The BH RLC channel further has to be marked with the corresponding priority/QoS-class on IAB-node MT and parent node.
   b. Establishment of adapt route(s) between IAB-node MT and IAB-donor DU. This includes:
      Configuration of adapt routing identifier(s) on IAB-node MT and IAB-donor DU (RAN2; FFS),
      Configuration of routing entries on all IAB-node's ancestor nodes for new routing identifier (RAN2; FFS),
   c. IP address allocation to IAB-node for adapt interface, which is routable from wireline fronthaul via adapt route.
      The IP address must be specific to IAB-donor DU so that CU can send IP packets to IAB-node via this specific IAB-donor DU and the new adapt route. The IAB-donor DU has to support a pool of IP addresses that are routable from wireline fronthaul for all descendant IAB-nodes.
      If IP assignment is done by CU, the CU must know IAB-donor-DU's available IP address pool for IAB nodes.
      If IP assignment is done via DHCPv4/6 with DHCP proxy on IAB-donor-DU, as proposed in TR, a transport mechanism of ARP/NDP on top of adapt layer needs to be defined.
      There may be other options for IP address allocation.
   Once the UE context for the IAB node is setup in the RAN, the RAN will establish one or more backhaul bearers that can be used for IP address assignment to IAB node. For the situations where the IAB node is not directly communicating with the IAB-Donor node, but via other (already attached/connected) IAB nodes, the forwarding information in all intermediate IAB nodes will be updated due to the setup of new IAB node.

3. DU Setup
   a. DU establishes F1-C and cell activation using IP on adapt layer (procedure defined in TS 38.401 clause 8.5: F1 startup and cells activation).
   b. This includes OAM support for IAB-node DU via backhaul IP layer.
   After establishing connectivity to the operator's internal network, the DU functionality of IAB node and its cells/sectors need to be configured by the OAM before the DU can send an F1 SETUP REQUEST message to its corresponding CU, i.e. IAB-CU. The recommended architecture option for IAB supports the full IP connectivity to the IAB node, making it possible that the DU functionality can have direct IP connectivity to the OAM, instead of relying on the MT functionality to establish a special PDU session in the CN for OAM. Finally, after configuring the DU functionality of the IAB node, the IAB node becomes operational as a DU and UEs will not be able to distinguish it from other gNBs. As such, it can start serving UEs like any other DU/gNB.

Note that the protocol architectures illustrated in FIGS. 4-5 can manage IP address assignment internally in the RAN without CN involvement. In that respect, the above baseline allows for DHCP-based IP address assignment and setting up the OAM after IP address assignment without an MT establishing a PDU session. The three parts of the overall IAB node integration procedure are discussed below.

Figure 6:
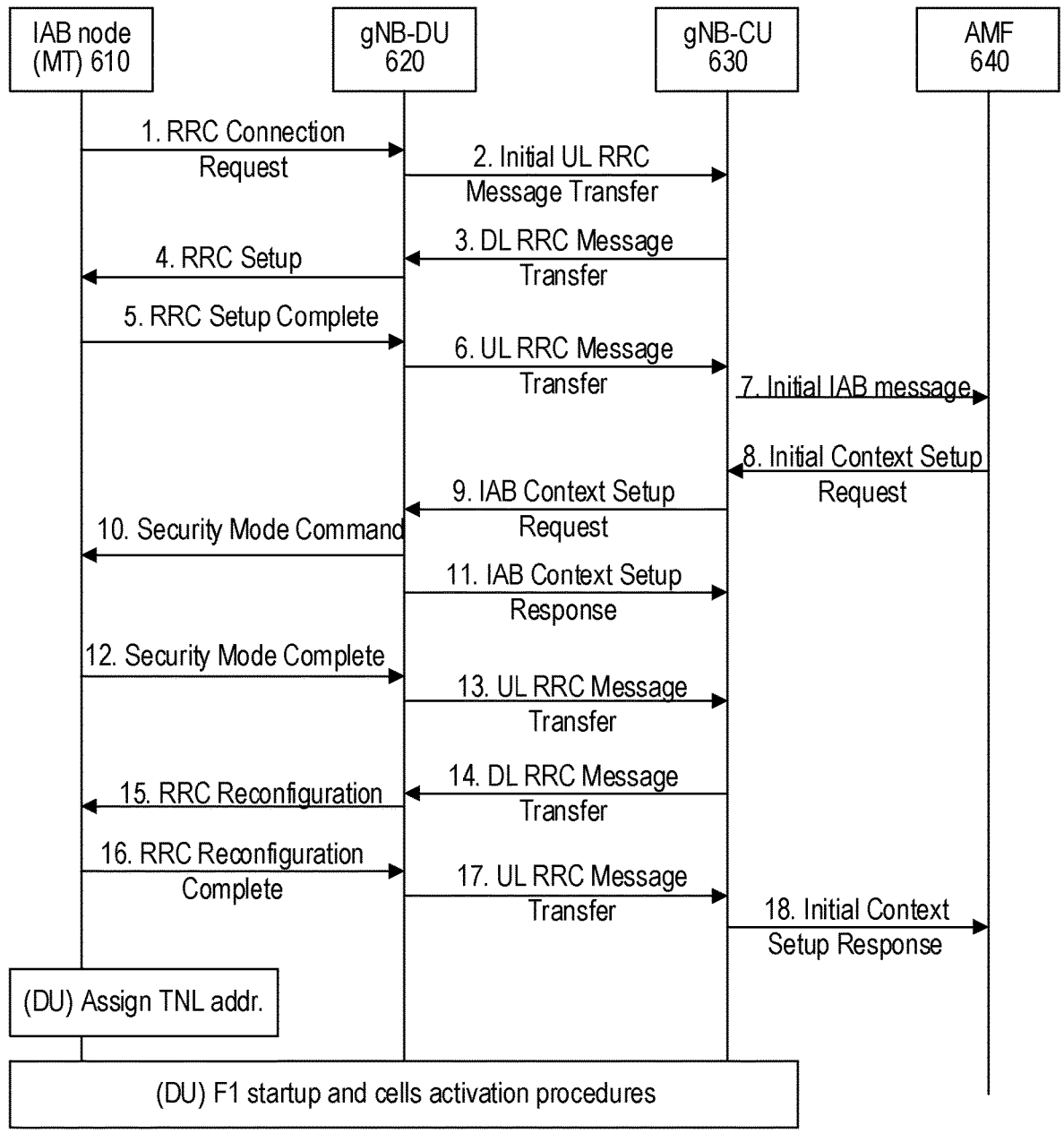
FIG. 6 shows an exemplary procedure for integrating an IAB node into a next-generation radio access network (NG-RAN).

The procedure for initial IAB node access can be based on the UE Initial Access signaling flow with slight modifications to fulfil the IAB node requirements. Meanwhile, for activation of IAB node DU cells, the F1 Startup and cells activation procedure defined in TS 38.401 can be reused as is. Taking the above into account, FIG. 6 shows an exemplary procedure for integrating an IAB node (610, including an MT and DU) into an NG-RAN that includes a split gNB (gNB-CU 630, gNB-DU 620). FIG. 6 also shows interactions with an AMF (640) in the 5GC.

Although the operations shown in FIG. 6 and described below are numbered sequentially, this numbering is used to facilitate explanation rather than to limit the operations to occur in any particular order, unless specifically noted to the contrary.

1. The IAB node (e.g., the MT) sends an RRCConnectionRequest message to the gNB-DU.
2. The gNB-DU includes the RRC message and, if the IAB node is admitted, the corresponding lower layer configuration for the NR Uu interface in the INITIAL UL RRC TRANSFER message and transfers to the gNB-CU. The INITIAL UL RRC TRANSFER message includes the C-RNTI allocated by the gNB-DU.
3. The gNB-CU allocates a gNB-CU UE F1AP ID for the IAB node and generates RRCSetup message towards the IAB node. The RRC message is encapsulated in the DL RRC MESSAGE TRANSFER message.
4. The gNB-DU sends the RRCSetup message to the IAB node.
5. The IAB node sends the RRC CONNECTION SETUP COMPLETE message to the gNB-DU. The S-NSSAI IE in the RRC CONNECTION SETUP COMPLETE message indicates the IAB node.
6. The gNB-DU encapsulates the RRC message in the UL RRC MESSAGE TRANSFER message and sends it to the gNB-CU.
7. The gNB-CU sends the INITIAL UE MESSAGE to the AMF. This could be a dedicated AMF serving only the IAB nodes.

At this point the IAB node will perform registration (including authentication and key generation) without establishing a PDU session.

8. The AMF sends the INITIAL CONTEXT SETUP REQUEST message to the gNB-CU.
9. The gNB-CU sends the IAB CONTEXT SETUP REQUEST message to establish the IAB node context in the gNB-DU. In this message, it may also encapsulate the SecurityModeCommand message.
10. The gNB-DU sends the SecurityModeCommand message to the IAB node.
11. The gNB-DU sends the IAB CONTEXT SETUP RESPONSE message to the gNB-CU.
12. The IAB node responds with the SecurityModeComplete message.
13. The gNB-DU encapsulates the RRC message in the UL RRC MESSAGE TRANSFER message and sends it to the gNB-CU.
14. The gNB-CU generates the RRCReconfiguration message and encapsulates it in the DL RRC MESSAGE TRANSFER message. The RRCReconfiguration could include a configuration of one or more IAB backhaul bearers.
15. The gNB-DU sends RRCReconfiguration message to the IAB node.
16. The IAB node sends RRCReconfigurationComplete message to the gNB-DU.
17. The gNB-DU encapsulates the RRC message in the UL RRC MESSAGE TRANSFER message and sends it to the gNB-CU.
18. The gNB-CU sends the INITIAL CONTEXT SETUP RESPONSE message to the AMF.

At this point, the IAB node will have established one or more backhaul bearers that can be used for creating TNL connectivity (e.g. for the IAB-DU) toward gNB-CU and assigning a TNL address (e.g., IP address and port). Next, the IAB node (e.g., the DU) can utilize the F1 Startup and Cells Activation procedures described in 3GPP TS 38.401 (v15.6.0) to activate its cells and become operational. After activating its cells, the IAB node is operational and can serve the UEs via the DU. The UEs can connect to the IAB node via the UE Initial Access procedure described in 3GPP TS 38.401 (v15.6.0).

As briefly discussed above and shown in FIGS. 4-5, a new Backhaul Adaptation Protocol (BAP) layer has been introduced in the IAB nodes and the TAB donor. The BAP layer routes packets to the appropriate downstream and upstream nodes, maps UE bearer data to the proper backhaul RLC channel, and maps between ingress and egress backhaul (BH) RLC channels in intermediate IAB nodes.

Although the BAP (also referred to as "adaptation layer") has not been fully specified, several agreements have been reached within 3GPP RAN2 WG. In addition to the function of mapping the UE bearer data to the proper backhaul RLC channel, it has also been agreed that the transmit (TX) part of the adaptation layer performs routing and bearer mapping, while the receive (RX) part of adaptation layer performs bearer "de-mapping". Furthermore, it has been agreed that service data units (SDUs) are forwarded from RX part of adaptation layer to TX part of adaptation layer (for the next hop) for packets that are relayed by the IAB node.

However, it is for further study (FFS) how to model protocol entities, e.g., whether separate or combined for DU and MT, and whether these parts are configured via F1-AP or RRC. Even so, there is a consensus among participants about including the BAP entity in both MT and DU parts of the IAB-node protocol stack. Modelling the BAP layer this way facilitates the realization of the routing and mapping functionalities of the adaptation layer.

Before discussing the operations of the two BAP entities, an initial aspect to consider is whether the radio bearers (RBs) carrying CP/UP traffic for the MT part of an IAB node should be handled separately from the BH RLC channels. Note that the BH RLC channels are used to carry traffic to/from the IAB node DU parts, which could be either be intended for the UEs served by the IAB node or for the child IAB nodes. This aspect at least suggests that RBs and BH RLC channels should be handled separately by employing different logical channel IDs.

Figure 7A:
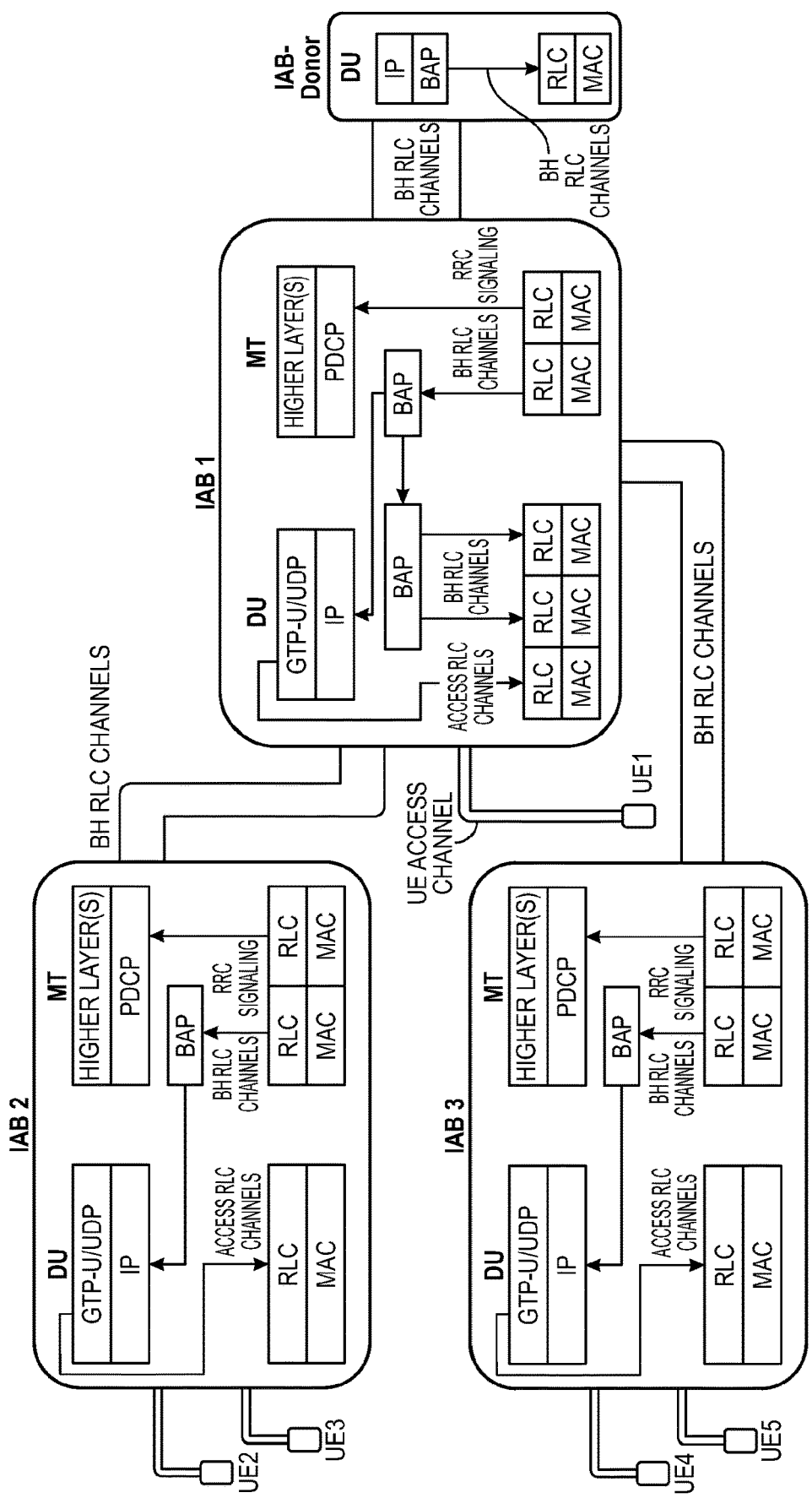
FIGS. 7A and 7B illustrate an exemplary flow of packets in a downlink (DL) direction from an IAB donor DU to UE(s) and/or intermediate IAB nodes.
Figure 7B:
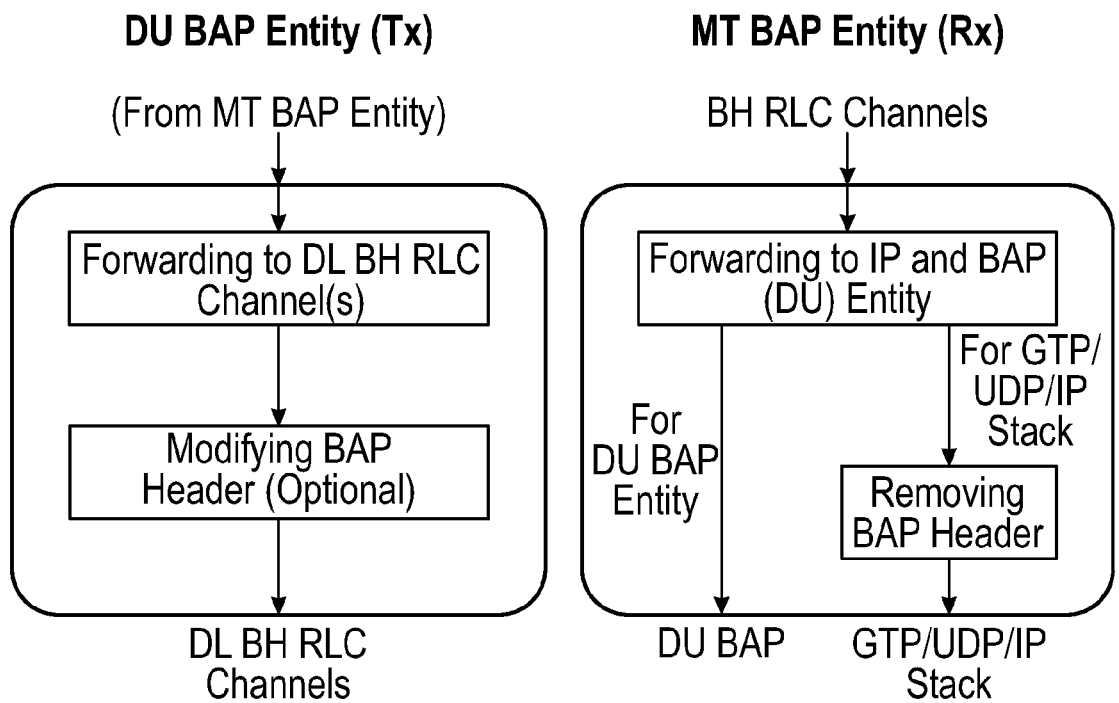
Figure 8A:
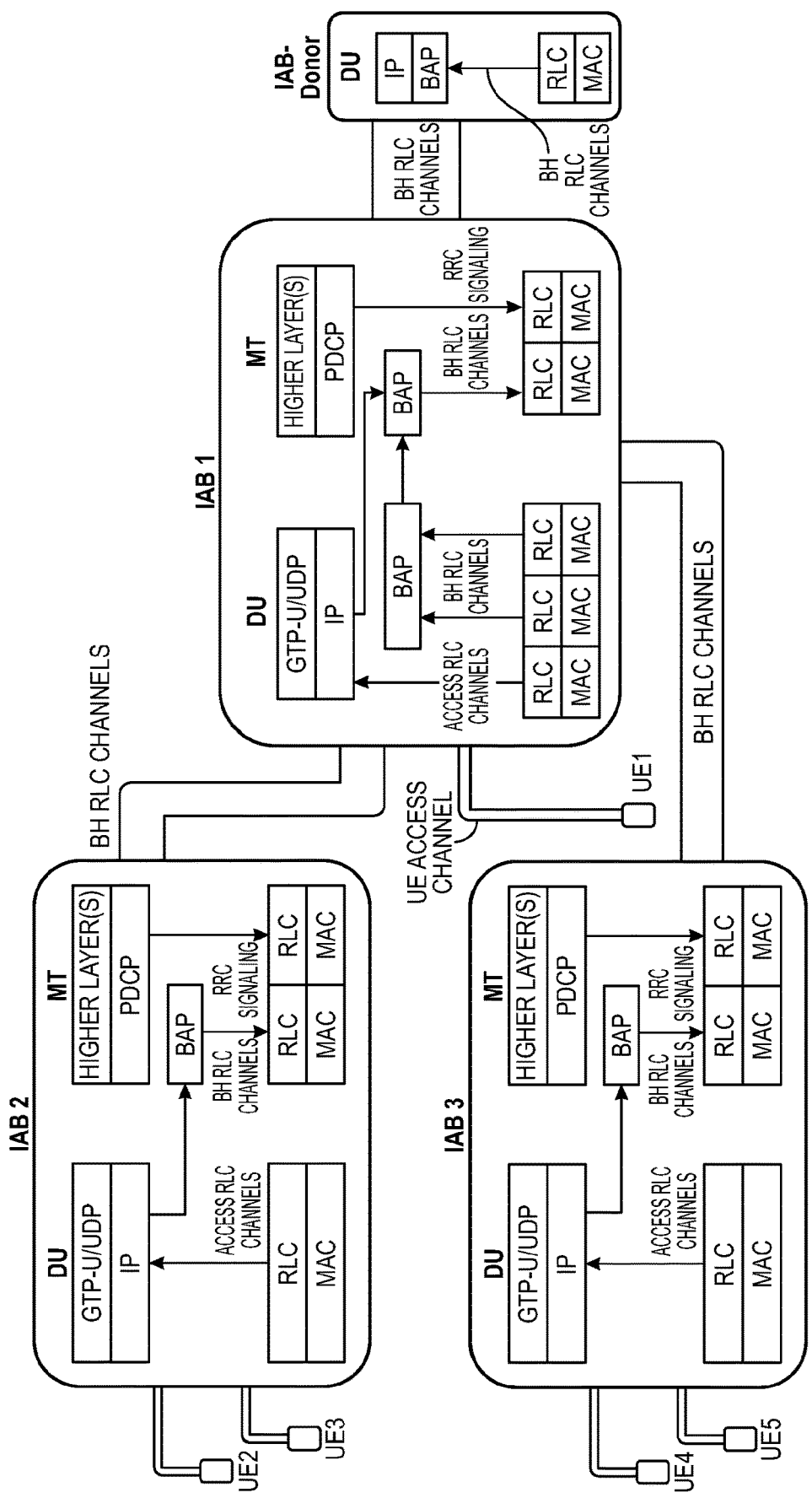
FIGS. 8A and 8B illustrate an exemplary flow of packets in an uplink (UL) direction from UE(s) and/or intermediate IAB nodes to an IAB donor DU.
Figure 8B:
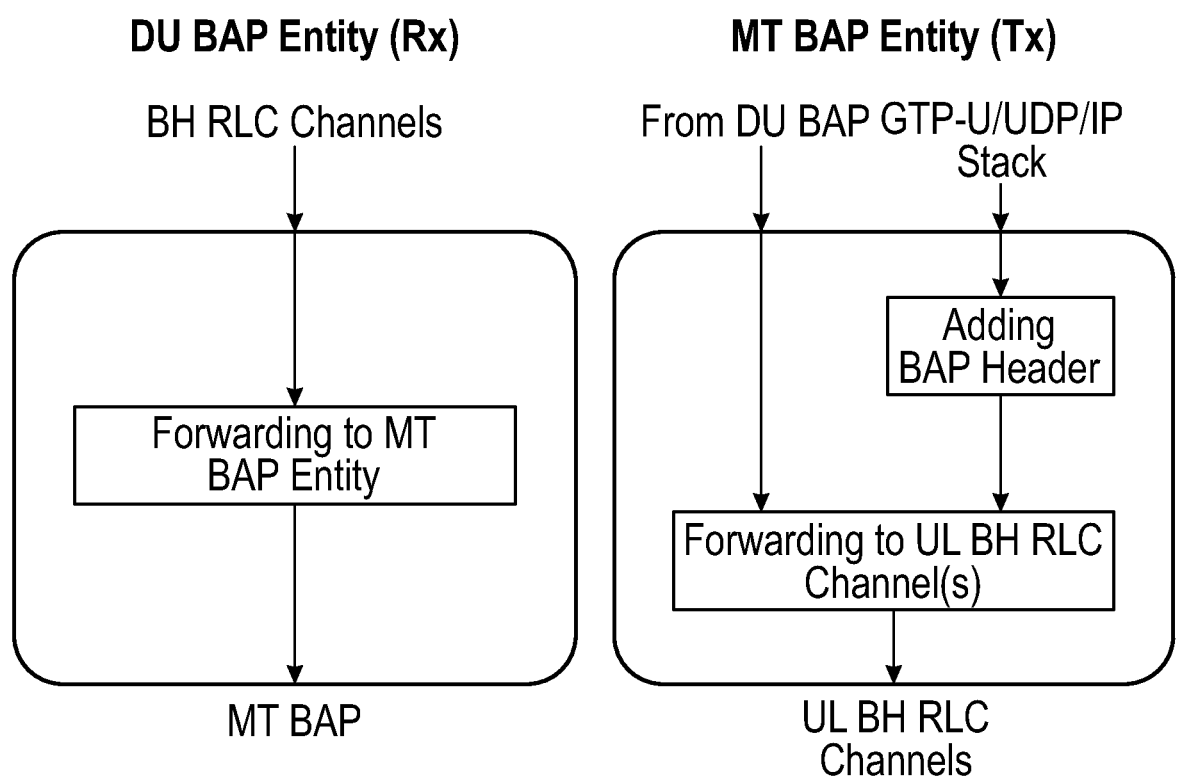

FIGS. 7A and 7B illustrate an exemplary flow of packets in the DL direction from an IAB donor DU to UE(s) and/or intermediate IAB nodes. Likewise, FIGS. 8A and 8B illustrate an exemplary flow of packets in the UL direction from UE(s) and/or intermediate IAB nodes to the IAB donor DU. In particular, FIGS. 7A and 8A show the respective flows of packets and FIGS. 7B and 8B show the respective operations in an intermediate IAB node BAP layers for the DL and UL cases. These figures provide context for the following description.

When a DL packet arrives at the IAB donor DU (e.g., from the donor CU) it is processed first by the DU upper layers since there is no MT BAP layer at the donor DU. If the packet is destined for UEs directly connected to the IAB donor DU or it is F1-AP traffic destined for the IAB donor DU, it is forwarded to higher layers (IP/UDP/GTP-U for UP, IP/SCTP/F1-AP for CP). Otherwise, if the packet destination is further downstream, it is forwarded to the DU BAP layer.

When a DL packet arrives at an intermediate IAB node (e.g., from a parent IAB node or IAB donor DU) via backhaul RLC channels, it is processed first by the MT BAP layer. If the packet is destined for UEs directly connected to the IAB node's DU part or it is F1-AP traffic destined for the IAB node's DU, it is forwarded to higher layers (IP/UDP/ GTP-U for UP, IP/SCTP/F1-AP for CP). Otherwise, if the packet's destination is further downstream, it is forwarded to the DU BAP layer.

In the above, the (IAB donor or IAB node) DU BAP layer will determine via a route (e.g., to which downstream node) the packet should be forwarded, and which BH RLC channel within that route should be used for forwarding the packet. The input information for this BH RLC mapping is still discussed in RAN2.

When an UL packet arrives at the IAB donor DU from a child IAB node via backhaul RLC channels, it is processed first by the DU BAP layer and then forwarded to the donor CU. Note that since the donor DU can be connected to at most one donor CU, there is no routing functionality required.

When a packet arrives at an intermediate IAB node in the UL direction, if it is coming from a child IAB node via backhaul RLC channels it is processed first by the IAB node DU's BAP layer. Since every UL packet is destined to be forwarded to the donor CU, the packet is passed on to the MT BAP layer. On the other hand, if ta UE connected directly to the IAB node or it is F1-AP traffic originating from the IAB node itself, it is processed first by the higher layers (IP/UDP/GTP-U for UP, IP/SCTP/F1-AP for CP) and then forwarded to the IAB node's MT BAP layer.

With respect to traffic from UEs, an IAB node needs to map UE data radio bearers (DRBs) to BH RLC Channel(s). There are two options for this operation: one-to-one mapping and many-to-one mapping. FIG. 9 shows an example of one-to-one (1:1) mapping between UE DRBs and BH RLC Channels. In this option, each UE DRB is mapped onto a separate BH RLC channel on the first hop from IAB node 910 to IAB node 920. Further, each BH RLC channel is mapped onto a separate BH RLC channel on a subsequent hop from IAB node 920 to Donor IAB node 930 (including CU and DU). As such, the number of established BH RLC channels is equal to the number of established UE DRBs. UE and/or DRB identifiers may be required, e.g., if multiple BH RLC channels are multiplexed into a single BH logical channel. The type and placement (e.g., within the adaptation layer header) depends on the architecture/protocol option.

FIG. 10 shows an example of many-to-one (N:1) mapping between UE DRB and BH RLC Channel. In this option, seven UE DRBs are multiplexed onto three BH RLC channels between IAB nodes 910 and 920 based on specific parameters such as bearer QoS profile. Other information such as hop-count could also be configured. Furthermore, multiple DRBs belonging to different UEs can be multiplexed onto a single BH RLC channel. In addition, a packet from one BH RLC channel may be mapped onto a different BH RLC channel on the next hop (e.g., from IAB node 920 to Donor TAB node 930). All traffic mapped to a particular BH RLC channel receive the same QoS treatment on the air interface. It has been agreed in 3GPP RAN2 to support both 1:1 and N:1 mapping in Rel-16.

Figure 2:
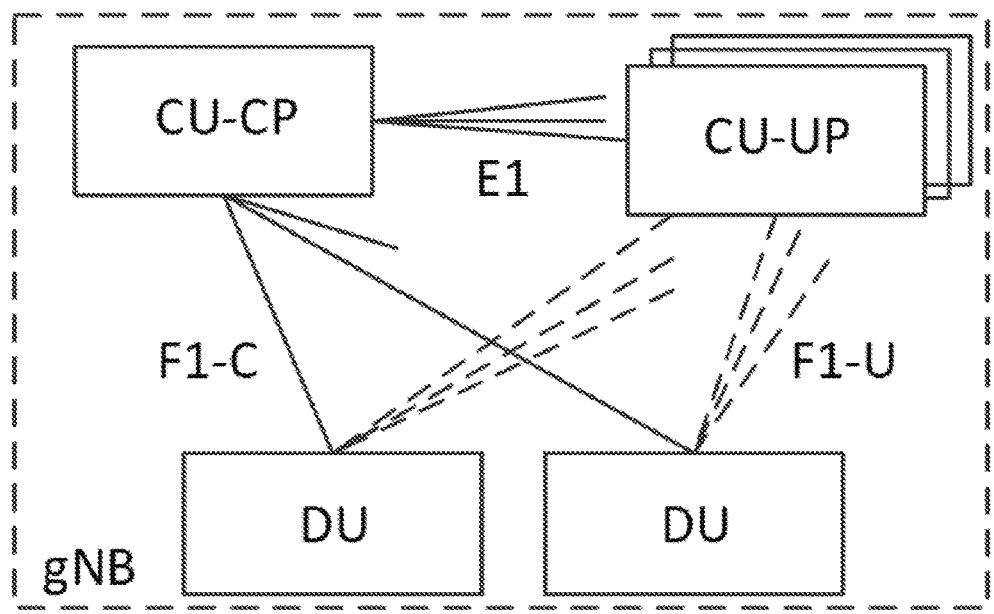
FIG. 2 shows the control-plane (CP) and user-plane (UP) interfaces within the split CU-DU architecture shown in FIG. 1.

In the CU-DU split architecture shown in FIGS. 1-2, F1-AP UE context setup request and UE context modification request messages are used by the CU to setup and modify UE bearers. The CU includes detailed information about the bearers, as shown by the relevant part of the UE context setup request in Table 1 below (similar information is provided also in the UE context modification request message). Table 2 shows an exemplary data structure for the QoS Flow Level QoS Parameters information element (IE) included in the UE context setup request message. This IE defines the QoS to be applied to a QoS flow or to a DRB. Likewise, Tables 3 and 4 show exemplary data structures for the Dynamic 5QI Descriptor and Non-Dynamic 5QI Descriptor IEs included in the QoS Flow Level QoS Parameters IE. These IEs indicate QoS characteristics for non-standardized/non-pre-configured and standardized/pre-configured 5QI, respectively, for DL and UL.

Upon the reception of the UE context setup (modification) request message, a DU will send a UE context setup (modification) response message containing a list of the bearers that the DU was able to setup, as well as the LCID that it has assigned to these bearers. The LCID-to-bearer association is based on DU configuration, where the DU can use the QoS parameters associated with the bearer, such as the 5QI, to determine the LCID.

TABLE 1

| IE/Group Name | Presence | Range | IE type/ref. | Semantics description |
|---|---|---|---|---|
| DRB to Be Setup List | | 0 . . . 1 | | |
| >DRB to Be Setup Item IEs | | 1 . . . <maxnoofDRBs> | | |
| >>DRB ID | M | | 9.3.1.8 | |
| >>CHOICE QoS Information | M | | | |
| >>>E-UTRAN QoS | M | | 9.3.1.19 | Used for EN-DC case to convey E-RAB Level QoS Parameters |
| >>>DRB Information | | 1 | | Shall be used for NG-RAN cases |
| >>>>DRB QoS | M | | 9.3.1.45 | |
| >>>>S-NSSAI | M | | 9.3.1.38 | |
| >>>>Notification Control | O | | 9.3.1.56 | |
| >>>>Flows Mapped to DRB Item | | 1 . . . <maxnoofQoSFlows> | | |
| >>>>>QoS Flow Identifier | M | | 9.3.1.63 | |
| >>>>>QoS Flow Level QoS Parameters | M | | 9.3.1.45 | |
| >>>>>QoS Flow Mapping Indication | O | | 9.3.1.72 | |
| >>UL UP TNL Information to be setup List | | 1 | | |
| >>> UL UP TNL | | 1 . . . | | |

TABLE 1-continued

| IE/Group Name | Presence | Range | IE type/ref. | Semantics description |
|---|---|---|---|---|
| Information to Be Setup Item IEs | | <maxnoofULUPTNLInformation> | | |
| >>>>UL UP TNL Information | M | | UP Transport Layer Information 9.3.2.1 | gNB-CU endpoint of the F1 transport bearer. For delivery of UL PDUs. |
| >> RLC Mode | M | | 9.3.1.27 | |
| >> UL Configuration | O | | UL Configuration 9.3.1.31 | Information about UL usage in gNB-DU. |
| >>Duplication Activation | O | | 9.3.1.36 | Information on the initial state of CA based UL PDCP duplication |
| >> DC Based Duplication Configured | O | | ENUMERATED (true, . . . , false) | Indication on whether DC based PDCP duplication is configured or not. If included, it should be set to true. |
| >>DC Based Duplication Activation | O | | Duplication Activation 9.3.1.36 | Information on the initial state of DC basedUL PDCP duplication |
| >>DL PDCP SN length | M | | ENUMERATED (12 bits, 18 bits, . . .) | |
| >>UL PDCP SN length | O | | ENUMERATED (12 bits, 18 bits, . . .) | |

25

TABLE 2

| IE/Group Name | Presence | IE type/ref. | Semantics description |
|---|---|---|---|
| CHOICE QoS Characteristics | M | | |
| >Non-dynamic 5QI | | | |
| >>Non Dynamic 5QI Descriptor | M | 9.3.1.49 | |
| >Dynamic 5QI | | | |
| >>Dynamic 5QI Descriptor | M | 9.3.1.47 | |
| NG-RAN Allocation and Retention Priority | M | 9.3.1.48 | |
| GBR QoS Flow Information | O | 9.3.1.46 | Present for GBR QoS Flows only. |
| Reflective QoS Attribute | O | ENUMERATED (subject to, . . .) | Details in TS 23.501 [21]. This IE applies to non-GBR flows only and shall be ignored otherwise. |
| PDU Session ID | O | INTEGER (0 . . . 255) | As specified in TS 23.501 [21], |
| UL PDU Session Aggregate Maximum Bit Rate | O | Bit Rate 9.3.1.22 | The PDU session Aggregate Maximum Bit Rate Uplink which is associated with the involved PDU session. |

TABLE 3

| IE/Group Name | Presence | IE type/ref. | Semantics description |
|---|---|---|---|
| QoS Priority Level | M | INTEGER (1 . . . 127) | For details see 3GPP TS 23.501 |
| Packet Delay Budget | M | 9.3.1.51 | For details see 3GPP TS 23.501 |
| Packet Error Rate | M | 9.3.1.52 | For details see 3GPP TS 23.501 |
| 5QI | O | INTEGER (0 . . . 255, . . .) | This IE contains the dynamically assigned 5QI as specified in 3GPP TS 23.501. |
| Delay Critical | C-ifGBRflow | ENUMERATED (delay critical, non-delay critical) | For details see 3GPP TS 23.501 |
| Averaging Window | C-ifGBRflow | 9.3.1.53 | For details see 3GPP TS 23.501 |

TABLE 3-continued

| IE/Group Name | Presence | IE type/ref. | Semantics description |
|---|---|---|---|
| Maximum Data Burst Volume | O | 9.3.1.54 | For details see 3GPP TS 23.501. This IE shall be included if the Delay Critical IE is set to "delay critical" and shall be ignored otherwise. |

TABLE 4

| IE/Group Name | Presence | IE type/ref. | Semantics description |
|---|---|---|---|
| 5QI | M | INTEGER (0 ... 255, ...) | This IE contains the standardized or pre-configured 5QI as specified in 3GPP TS 23.501. |
| Priority Level | O | INTEGER (1 ... 127) | For details see 3GPP TS 23.501. When included overrides standardized or pre-configured value. |
| Averaging Window | O | 9.3.1.53 | This IE applies to GBR QoS Flows only. For details see 3GPP TS 23.501. When included overrides standardized or pre-configured value. |
| Maximum Data Burst Volume | O | 9.3.1.54 | For details see 3GPP TS 23.501. When included overrides standardized or pre-configured value. If the 5QI refers to a non-delay critical QoS flow the IE shall be ignored. |

In order to support QoS prioritization of different end-user traffic, it is necessary to map the end-user traffic to different BH RLC channels, each associated with a different LCID.

U.S. Prov. Appl. 62/871,848 by the present applicant discusses how the IP flow label (associated with a given end-user flow) can be used and signalled for 1:1 bearer mapping in IAB networks. That application also discusses how the IP flow label-to-LCID mapping information can be sent to the donor DU (for DL mapping) and to the access IAB node (for UL mapping). That application also assumed that the legacy LCID assignment was used (i.e., a DU assigns the LCID for the BH RLC channels), and that in intermediate IAB nodes the same LCID will be used for the ingress and egress channels so that no mapping information was communicated to the intermediate nodes. Nevertheless, since each IAB node may assign different LCID values for the BH RLC channels being setup, it can't be assumed that implicit mapping information is available at intermediate IAB nodes.

When a UE bearer to be mapped 1:1 is being set up, dedicated BH RLC channels must be set up on each hop between the donor DU and the access IAB node, which can be done by sending a UE context modification message to the donor DU as well as to each intermediate IAB node. As discussed in Appl. 62/871,848, the IP flow label to be associated with the BH RLC channel on the first DL hop needs to be communicated in the UE context modification message to the donor DU, so that the donor DU will be able to map future DL packets with that flow label to this BH RLC channel being set up.

In the intermediate IAB nodes, the flow label is not relevant since bearer mapping from the ingress to egress BH RLC channels is performed based on LCIDs. For example, the mapping can be between ingress and egress BH RLC channels having the same LCID, or the intermediate node can be configured with a mapping from an ingress BH RLC channel LCID to an egress BH RLC channel LCID. Also, intermediate IAB nodes do not need to be aware of the type of mapping (i.e., 1:1 vs N:1) because they are concerned only with how to map ingress to egress channels.

If the donor DU (and intermediate IAB node DU parts) were to choose the LCID of the BH RLC channels they are setting up to their child nodes as currently done for DRBs, each IAB node can assign a different LCID for the BH RLC channels that are being set up for the sake of one UE bearer that is to be mapped 1:1. As such, the CU either has to wait for the UE context modification response messages from the donor DU and the intermediate IAB nodes to get the LCID, and then it has to send additional configuration message to each intermediate IAB node to associate these LCIDs. Alternatively, the CU could setup one BH RLC channel at a time, waiting for a response from one UE context modification request before sending another UE context modification request for the next hop. In either case, significant latency can be introduced for setting up 1:1 mapped DRBs if many hops are involved. Similar problems occurs when adding a new N:1 mapped bearer to a child IAB node when each child node can freely allocate their own LCIDs.

As a more concrete example, consider a three hop IAB network, IAB3-IAB2-IAB1-donor DU-donor CU. For either a 1:1- or N:1-mapped bearer, three BH RLC channels (i.e., donor DU-IAB1, IAB1-IAB2, IAB2-IAB3) have to be setup via respective UE context modification request messages to the donor DU, IAB1-DU, and IAB2-DU. In the resulting UE context modification response messages, the donor DU, IAB1-DU, and IAB2-DU will inform the CU of the LCIDs assigned to the corresponding BH RLC channels being set up (e.g., LCIDa, LCIDb, and LICDc, respectively). Then additional signalling between the CU and the intermediate IAB nodes is required to inform the IAB nodes to update their mapping tables (i.e., IAB1 to map LCIDa to LCIDb, IAB2 to map LCIDb to LCIDc, etc.). One drawback is that considerable delay may be incurred in the setup procedure for bearers in IAB network, which in turn can affect the end-user experience.

Embodiments of the present disclosure address these and other problems, difficulties, and/or issues by providing techniques that facilitate a faster setup of BH RLC channels in a multi-hop IAB network. At a very high level, a first disclosed technique is for a DU to perform the LCID assignment, as in legacy CU-DU arrangement, but the UE context setup (modification) message sent to an IAB node includes the LCID value used by the receiving IAB node's parent node when setting up a BH RLC channel to be associated with the BH RLC channel that is being setup by the current UE context setup (modification) message. In this case, no additional latency is incurred when setting up only one new BH RLC channel.

At a very high level, a second disclosed technique is letting the donor CU select the LCID(s) to be used for BH RLC channel(s) and communicate the selected LCID value (s) to the donor DU and the intermediate IAB nodes in the UE Context Setup (modification) procedures. This makes it possible to send the UE context setup (modification) message to the donor DU and each intermediate IAB node in parallel, thereby reducing the latency involved in setup of new bearers involving multiple hops. Unlike the legacy case where DUs select LCIDs, the donor DU and the intermediate IAB node will simply use the LCID indicated by the CU for the BH RLC channel that is being setup. In that way, no additional signaling is required and by the time the BH RLC channels are setup, the mapping information at each intermediate IAB node is already known. The second technique can be used individually or in combination with the first technique, and vice versa.

Disclosed embodiments reduce the signaling overhead and the total latency required to setup a bearer and its associated BH RLC channels in a multi-hop IAB network, thereby improving end user experience compared to current solutions. For example, including the LCID used for a BH RLC channel by a parent node in the UE context setup (modification) message to a child node enables the bearer mapping to be performed in the intermediate IAB node at the same time as the BH RLC channel being setup towards the child node of the IAB node, thus avoiding the need to send an extra bearer mapping information after the parent and child BH RLC channels are setup.

Additional latency reduction can be achieved by letting the donor CU (instead of the donor DU or DU parts of the IAB nodes) assign the LCID of the BH RLC channels in an IAB network. This will require no additional bearer mapping signaling messages towards intermediate IAB nodes in order to associate their ingress and egress RLC channels, since the same LCID will be used for all associated BH RLC channels. This provides the possibility to send all UE context modification messages in parallel and reduce the latency even further.

In the following description of various embodiments, the terms "setup" and "configuration" are used interchangeably except where expressly noted otherwise, or when used as part of a label or name (e.g., of a specific message). Furthermore, functionality described in relation to donor CUs can be mapped to the CU-CP portion of a split-CU architecture (such as shown in FIGS. 2-3) unless expressly noted otherwise.

As mentioned above, in some embodiments, the BH RLC channel LCIDs can be selected by a DU part, e.g., donor DU or DU part of an IAB node. In these embodiments, however, the UE context setup (modification) message sent to an intermediate IAB node includes the LCID that was used by the IAB node's parent to setup the BH RLC channel that is to be associated with the BH RLC channel currently being setup for a child node.

These embodiments can be illustrated with reference to the exemplary three hop IAB network (i.e., IAB3-IAB2-IAB1-donor DU-donor CU) discussed above. In this exemplary scenario, the donor CU receives the information about the LCID (e.g., LCIDa) used in the first hop between donor-DU and IAB1 in the UE context modification response message from the donor DU. The CU will include LCIDa in the UE context modification request message sent to IAB1. In turn, IAB1 will choose LCIDb for the corresponding BH RLC channel that it is sets up, and save the LCIDa/LCIDb mapping information. Subsequently, IAB1 will map packets incoming from a downstream node via LCIDa to LCIDb towards the upstream node, and vice versa. IAB1 will indicate LCIDb in the UE context modification response message to the donor CU, and the donor CU will indicate the same in the UE context modification setup message to the next IAB node. In this manner, the mapping information in the intermediate IAB nodes is performed at the same time as the BH RLC channel being setup towards a downstream node.

In a variant, to further optimize the performance, the donor CU could send the UE context modification request message towards IAB1 at the same time it sends IAB1 an RRC message for setting up the MT part of the BH RLC channel for which the DU part was previously setup. This RRC message can also include the LCID of the BH RLC channel (e.g., LCIDa). Regardless of which message (RRC or F1) arrives first, IAB1 will be able to understand the mapping between the bearer since the F1 message contains the same LCID as was signalled on RRC. Parallel handling can then also be performed for IAB2, etc.

These embodiments can be further illustrated by exemplary changes to an existing UE Context Modification Request message, as defined in 3GPP TS 38.473 (v15.6.0) § 9.2.2.7, to facilitate sending from CU to a donor DU and all intermediate nodes for setting up backhaul RLC channels in a multi-hop IAB network. Table 5 below shows the relevant part of this message that could be modified according to these embodiments.

More specifically, the lists BH RLC Channel to be Setup List, BH RLC Channel to be Modified List, and BH RLC Channel to be Released List are added. Each list includes IEs for the respective BH RLC channels comprising the list. The IE for each BH RLC channel to be setup or modified includes a channel (CH) ID, QoS Parameters, and QoS mapping information. The IE for each BH RLC channel to be released includes only the CH ID. Similar exemplary modifications/additions can be made to the existing UE Context Setup Request message sent from CU to DU, such as defined in 3GPP TS 38.473 (v15.6.0) § 9.2.2.1.

TABLE 5

| IE/Group Name | Presence | Range | IE type/ref. | Semantics description |
|---|---|---|---|---|
| BH RLC Channel to be Setup List | | 0 . . . 1 | | |

TABLE 5-continued

| IE/Group Name | Presence | Range | IE type/ref. | Semantics description |
|---|---|---|---|---|
| >BH RLC Channel to be Setup Item IEs | | 1 ... <maxnoofBHRLCCHs> | | |
| >>BH RLC CH ID | M | | 9.3.1.x | |
| >>BH RLC CH QoS Parameters | M | | The details of QoS parameters for BH RLC Channel are FFS. | |
| >>IAB QoS mapping information | O | | 9.3.1.y | Information for mapping bearers in IAB networks. |
| BH RLC Channel to be Modified List | | 0 ... 1 | | |
| >BH RLC Channel to be Modified Item IEs | | 1 ... <maxnoofBHRLCCHs> | | |
| >>BH RLC CH ID | M | | 9.3.1.x | |
| >>BH RLC CH QoS Parameters | M | | The details of QoS parameters for BH RLC Channel are FFS. | |
| >> IAB QoS mapping information | O | | 9.3.1.y | Information for mapping bearers in IAB networks. |
| BH RLC Channel to be Released List | | 0 ... 1 | | |
| >BH RLC Channel to be Released Item IEs | | 1 ... <maxnoofBHRLCCHs> | | |
| >>BH RLC CH ID | M | | 9.3.1.x | |

Table 6 further illustrates an exemplary structure of the QoS mapping information shown in Table 5. This includes the LCID of the parent (or immediately upstream) backhaul PLC channel to which the backhaul PLC channel being setup should be mapped.

TABLE 6

| IE/Group Name | Presence | IE type/ref. | Semantics description |
|---|---|---|---|
| IPv6 Flow Label | O | BIT STRING (20) | Represents the IPv6 Flow Label value that is used by the transport layer for the DL User Plane packets for the given DRB. This is included only in the message to the donor DU and applicable for the case of one-to-one bearer mapping. |
| Parent hop LCID | O | 9.3.1.35 | LCID of the parent backhaul RLC channel that the backhaul RLC channel being setup should be mapped to. |

As mentioned above, in some embodiments, the BH RLC channel LCIDs can be selected by the donor CU, which can communicate the selected LCID(s) to the donor DU and the intermediate IAB nodes in the UE context setup or UE context modification procedures. As such, UE context modification (setup) messages can be sent in parallel (e.g., substantially concurrently) to the donor-DU and each intermediate IAB node, which reduces the latency to setup of new bearers. Unlike legacy DU assignment of LCIDs, the donor DU and the intermediate IAB node(s) will simply use the LCID indicated by the CU for the BH RLC channel that is being setup. In that way, no additional signaling is required and by the time the BH RLC channels are setup, the mapping information at each intermediate IAB node is already known.

These embodiments enable the donor CU to assign the same LCID value to all BH RLC channels that are associated with a UE DRB or with a QoS "class". In this case the CU only needs to send the child node BH RLC channel LCID to an intermediate IAB node, which implicitly indicates that the same LCID should be used for the corresponding BH RLC channel to the parent node.

If it is not feasible to use the same LCID on all the BH RLC channels that are associated with a UE bearer or QoS class, the CU can explicitly signal the LCID value used for the BH RLC channel to the parent node together with the LCID value to be used for the BH RLC channel to the child node.

In some embodiments, the donor CU assignment of LCIDs for BH RLC channels can be combined with DU (e.g., donor DU or IAB node DU part) assignment of LCIDs for DRBs. For example, different LCID ranges can be reserved for DU assignment to DRBs and CU assignment to BH RLC channels.

These embodiments can be further illustrated by exemplary changes to an existing UE Context Modification Request message, as defined in 3GPP TS 38.473 (v15.6.0) § 9.2.2.7, to facilitate sending from CU to a donor DU and all intermediate nodes for setting up backhaul RLC channels in a multi-hop IAB network. Table 7 below shows the relevant part of this message that could be modified according to these embodiments. More specifically, the lists BH RLC Channel to be Setup List, BH RLC Channel to be Modified List, and BH RLC Channel to be Released List are added. Each list is substantially identical to a corresponding list described above in relation to Table 5.

TABLE 7

| IE/Group Name | Presence | Range | IE type/ref. | Semantics description |
|---|---|---|---|---|
| BH RLC Channel to be Setup List | | 0 . . . 1 | | |
| >BH RLC Channel to be Setup Item IEs | | 1 . . . <maxnoofBHRLCCHs> | | |
| >>BH RLC CH ID | M | | 9.3.1.x | |
| >>BH RLC CH QoS Parameters | M | | | Details of QoS parameters for BH RLC Channel are FFS. |
| >>IAB QoS mapping information | O | | 9.3.1.y | Information for mapping bearers in IAB networks. |
| BH RLC Channel to be Modified List | | 0 . . . 1 | | |
| >BH RLC Channel to be Modified Item IEs | | 1 . . . <maxnoofBHRLCCHs> | | |
| >>BH RLC CH ID | M | | 9.3.1.x | |
| >>BH RLC CH QoS Parameters | M | | | The details of QoS parameters for BH RLC Channel are FFS. |
| >>IAB QoS mapping information | O | | 9.3.1.y | Information for mapping bearers in IAB networks. |
| BH RLC Channel to be Released List | | 0 . . .1 | | |
| >BH RLC Channel to be Released Item IEs | | 1 . . . <maxnoofBHRLCCHs> | | |
| >>BH RLC CH ID | M | | 9.3.1.x | |

Table 8 further illustrates an exemplary structure of the QoS mapping information shown in Table 7. This includes the LCID to be used for the backhaul PLC channel being setup.

TABLE 8

| IE/Group Name | Presence | IE type/ref. | Semantics description |
|---|---|---|---|
| IPv6 Flow Label | O | BIT STRING (20) | Represents the IPv6 Flow Label value that is used by the transport layer for the DL User Plane packets for the given DRB. This is included only in the message to the donor DU and applicable for the case of one-to-one bearer mapping. |
| LCID | O | 9.3.1.35 | LCID to be used for the backhaul RLC channel being setup. |

These embodiments described above can be further illustrated with reference to FIGS. 11-12, which depict exemplary methods (e.g., procedures) performed by a CU and an intermediate IAB node, respectively. Put differently, various features of the operations described below correspond to various embodiments described above.

Figure 11:
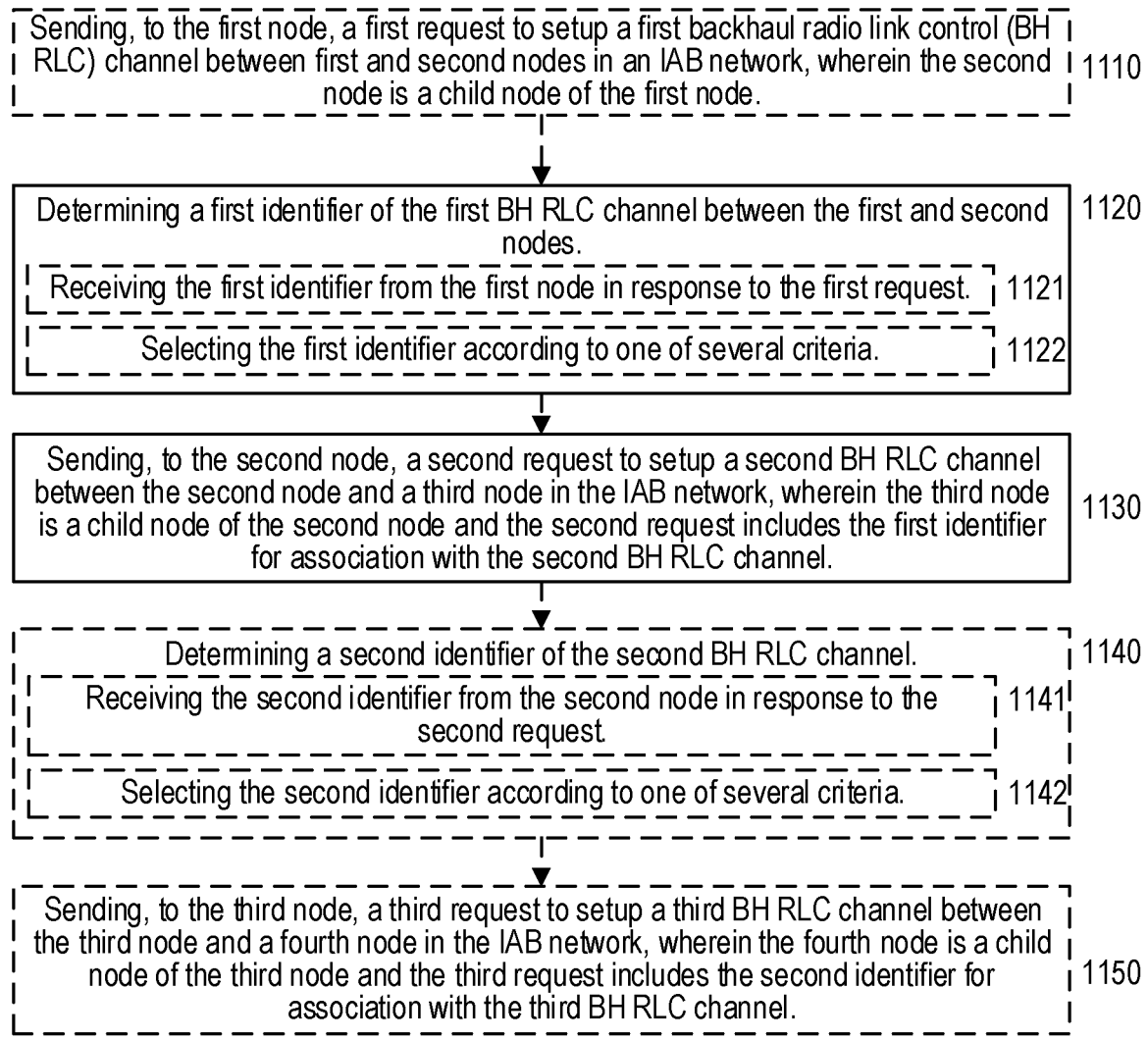
FIG. 11 shows an exemplary method for a centralized unit (CU) in an IAB network, according to various exemplary embodiments of the present disclosure.

More specifically, FIG. 11 illustrates an exemplary method (e.g., procedure) for a CU in an integrated access backhaul (IAB) network, according to various exemplary embodiments of the present disclosure. For example, the exemplary method shown in FIG. 11 can be performed by a donor CU described above or in relation to other figures herein. Furthermore, the exemplary method shown in FIG. 11 can be complementary to other exemplary methods disclosed herein (e.g., FIG. 12) such that they can be used cooperatively to provide benefits, advantages, and/or solutions to problems described herein. Although the exemplary method in FIG. 11 is illustrated by specific blocks in a particular order, operations corresponding to the blocks can be performed in different orders than shown and can be combined and/or divided into blocks and/or operations having different functionality than shown. Optional blocks and/or operations are indicated by dashed lines.

The exemplary method can include the operations of block 1120, where the CU can determine a first identifier (e.g., LCID) of a first backhaul radio link control (BH RLC) channel between first and second nodes in the IAB network. The second node is a child node of the first node, according to the meaning of "child node" explained elsewhere herein. The exemplary method can also include the operations of block 1130, where the CU can send, to the second node, a second request to setup a second BH RLC channel between the second node and a third node in the IAB network. The third node is a child node of the second node. The second request can include the first identifier for association with the second BH RLC channel.

In some embodiments, at least one data radio bearer (DRB) between a user equipment (UE) and the CU can be associated with both the first and second BH RLC channels. In some embodiments, the second request can be a context setup request or context modification request associated with the UE and the first identifier can be a logical channel identifier (LCID).

In some embodiments, the exemplary method can also include the operations of block 1110, where the CU can send, to the first node, a first request to setup the first BH RLC channel. In some of these embodiments, the determining operations of block 1120 can include the operations of sub-block 1121, where the CU can receive the first identifier from the first node in response to the first request to setup the first BH RLC channel. For example, the first identifier can be received from a distributed unit (DU) associated with the first node, and the second request can be sent (e.g., in block 1130) to a DU associated with the second node.

In other of these embodiments, the first request (e.g., sent in block 1110) can include the first identifier. In such embodiments, the determining operations of block 1120 can include the operations of sub-block 1122, where the CU can select the first identifier according to one of the following:
- from a pool of available BH RLC identifiers;
- same as an identifier of a further BH RLC channel, wherein the further BH RLC channel and the first BH RLC channel are associated with the same data radio bearer (DRB) between a user equipment (UE) and the CU; or
- based on quality-of-service (QoS) parameters associated with the first BH RLC channel.

In such embodiments, the second request can be sent to the second node (e.g., in block 1130) without waiting for a response from the first node to the first request (e.g., sent in block 1110).

In some embodiments, the exemplary method can include the operations of block 1140-1150. In block 1140, the CU can determine a second identifier of the second BH RLC channel. In block 1150, the CU can send, to the third node (i.e., child of the second node), a third request to setup a third BH RLC channel between the third node and a fourth node in the IAB network. The fourth node is a child node of the third node. The third request can include the second identifier for association with the third BH RLC channel.

In some of these embodiments, the determining operations of block 1140 can include the operations of sub-block 1141, where the CU can receive the second identifier from the second node in response to the second request (e.g., sent in block 1130). In other of these embodiments, the second request can include the second identifier. In such embodiments, the determining operations of block 1140 can include the operations of sub-block 1142, where the CU can select the second identifier according to one of the following:
- from a pool of available BH RLC identifiers;
- same as the first identifier;
- same as an identifier of a further BH RLC channel, wherein the further BH RLC channel and the second BH RLC channel are associated with the same data radio bearer (DRB) between a user equipment (UE) and the CU; or
- based on quality-of-service (QoS) parameters associated with the second BH RLC channel.

Figure 12:
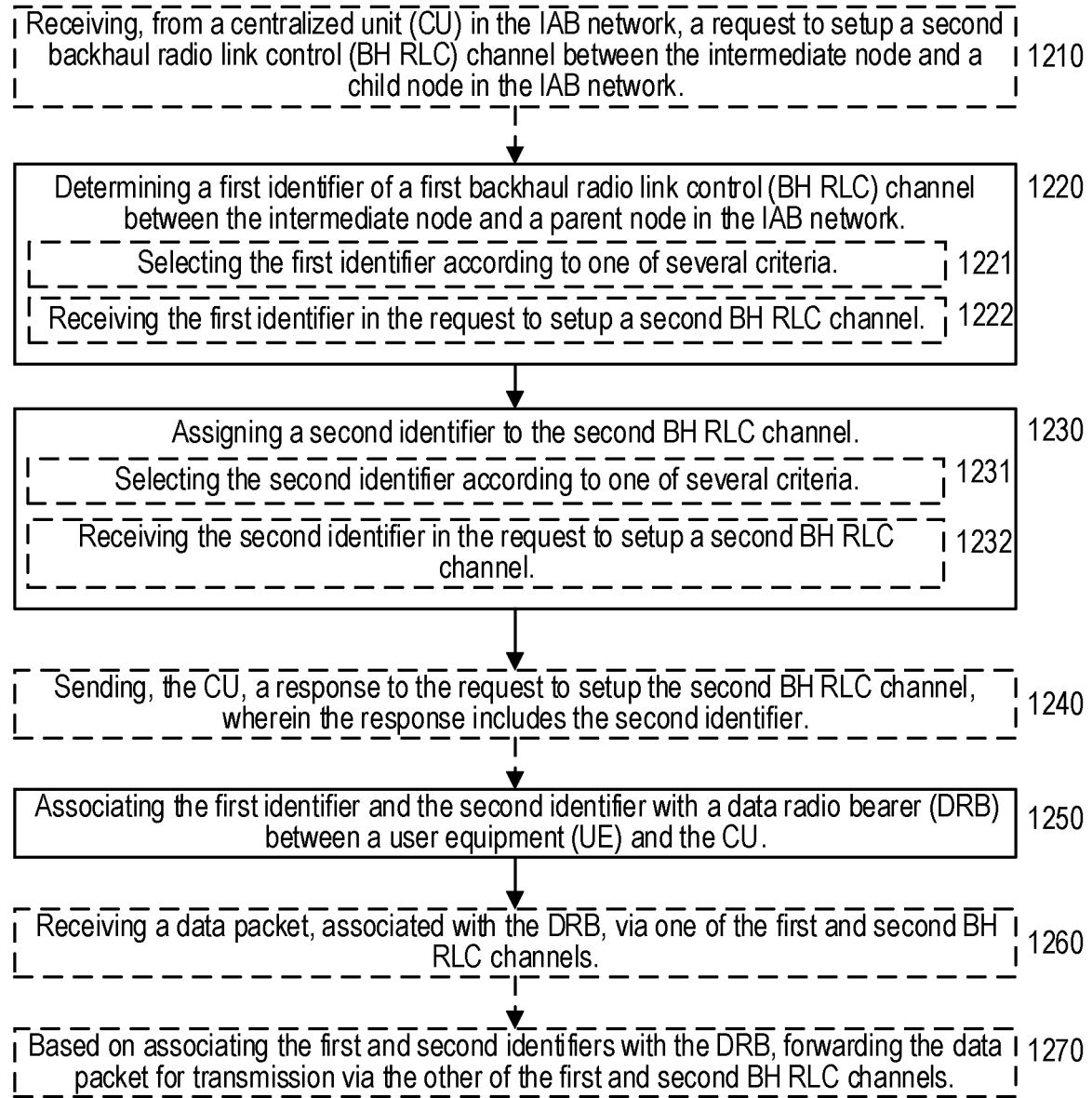
FIG. 12 shows an exemplary method for an intermediate node in an IAB network, according to various exemplary embodiments of the present disclosure.

In addition, FIG. 12 illustrates another exemplary method (e.g., procedure) for an intermediate node in an integrated access backhaul (IAB) network, according to various exemplary embodiments of the present disclosure. For example, the exemplary method shown in FIG. 12 can be performed by an IAB node described above or in relation to other figures herein, or a component of such a node (e.g., DU and/or MT). Furthermore, the exemplary method shown in FIG. 12 can be complementary to other exemplary methods disclosed herein (e.g., FIG. 11) such that they can be used cooperatively to provide benefits, advantages, and/or solutions to problems described herein. Although the exemplary method in FIG. 12 is illustrated by specific blocks in a particular order, operations corresponding to the blocks can be performed in different orders than shown and can be combined and/or divided into blocks and/or operations having different functionality than shown. Optional blocks and/or operations are indicated by dashed lines.

The exemplary method can include the operations of block 1220, where the intermediate node can determine a first identifier of a first backhaul radio link control (BH RLC) channel between the intermediate node and a parent node (e.g., of the intermediate node) in the IAB network, according to the meaning of "parent node" explained elsewhere herein. The exemplary method can also include the operations of block 1230, where the intermediate node can assign a second identifier to the second BH RLC channel between the intermediate node and a child node in the IAB network, according to the meaning of "child node" explained elsewhere herein. The exemplary method can also include the operations of block 1250, where the intermediate node can associate the first identifier and the second identifier with a data radio bearer (DRB) between a user equipment (UE) and the CU.

In some embodiments, the exemplary method can also include the operations of blocks 1260-1270. In block 1260, the intermediate node can receive a data packet, associated with the DRB, via one of the first and second BH RLC channels. In block 1270, the intermediate node can, based on associating the first and second identifiers with the DRB, forward the data packet for transmission via the other of the first and second BH RLC channels. In some of these embodiments, the intermediate node can include a mobile terminal (MT) part and a distributed unit (DU) part. In such embodiments, the data packet can be received by one of the MT and DU parts and can be forwarded for transmission by the other of the MT and DU parts.

In some embodiments, the exemplary method can also include the operations of block 1210, where the intermediate node can receive, from the CU, a request to setup the second BH RLC channel between the intermediate node and the child node. For example, the request can be a context setup request or context modification request associated with the UE and the first identifier can be a logical channel identifier (LCID).

In some of these embodiments, the determining operations of block 1220 can include the operations of block 1221, where the intermediate node can receive the first identifier in the request to setup the second BH RLC channel (e.g., received in block 1210).

In some of these embodiments, the assigning operations of block 1230 can involve different sub-blocks. For example, the assigning operations of block 1230 can include the operations of block 1232, where the intermediate node can receive the second identifier in the request to setup the second BH RLC channel (e.g., received in block 1210). As another example, the assigning operations of block 1230 can include the operations of block 1231, where the intermediate node can select the second identifier according to one of the following:
- from a pool of available BH RLC identifiers;
- same as the first identifier;
- same as an identifier of a further BH RLC channel associated with the DRB; or
- based on quality-of-service (QoS) parameters associated with the second BH RLC channel.

In other embodiments, the determining operations of block 1220 can include the operations of block 1222, where the intermediate node can select the first identifier according to one of the following:
- from a pool of available BH RLC identifiers;
- same as an identifier of a further BH RLC channel associated with the DRB; or
- based on quality-of-service (QoS) parameters associated with the first BH RLC channel.

In some embodiments, the exemplary method can also include the operations of block 1240, where the intermediate node can send, to the CU, a response to the request to setup the second BH RLC channel, wherein the response includes the second identifier.

Figure 13:
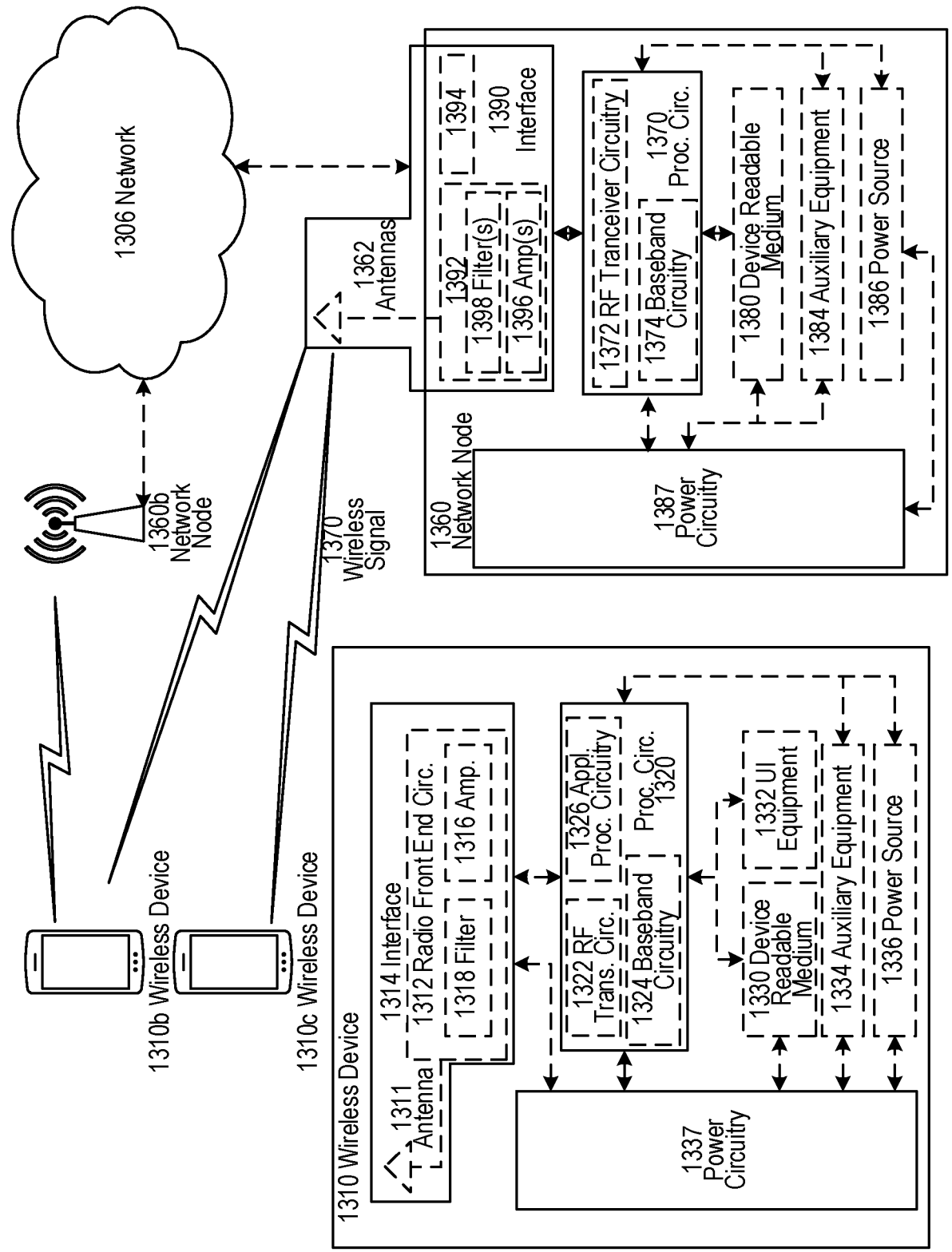
FIG. 13 shows an exemplary embodiment of a wireless network, according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 13. For simplicity's sake, the exemplary wireless network shown FIG. 13 only depicts network 1306, network nodes 1360 and 1360*b*, and WDs 1310, 1310*b*, and 1310*c*. In practice, a wireless network can further include any additional elements suitable to support communication between wireless devices or between a wireless device and another communication device, such as a landline telephone, a service provider, or any other network node or end device. Of the illustrated components, network node 1360 and wireless device (WD) 1310 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1306 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1360 and WD 1310 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 13, network node 1360 includes processing circuitry 1370, device readable medium 1380, interface 1390, auxiliary equipment 1384, power source 1386, power circuitry 1387, and antenna 1362. Although network node 1360 illustrated in the example wireless network of FIG. 13 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1360 are depicted as single boxes located within a larger box, or nested within multiple boxes, in practice, a network node can comprise multiple different physical components that make up a single illustrated component (e.g., device readable medium 1380 can comprise multiple separate hard drives as well as multiple RAM modules).

Similarly, network node 1360 can be composed of multiple physically separate components (e.g., a NodeB component and an RNC component, or a BTS component and a BSC component, etc.), which can each have their own respective components. In certain scenarios in which network node 1360 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1360 can be configured to support multiple radio access technologies (RATs). In such embodiments, some components can be duplicated (e.g., separate device readable medium 1380 for the different RATs) and some components can be reused (e.g., the same antenna 1362 can be shared by the RATs). Network node 1360 can also include multiple sets of the various illustrated components for different wireless technologies integrated into network node 1360, such as, for example, GSM, WCDMA, LTE, NR, WiFi, or Bluetooth wireless technologies. These wireless technologies can be integrated into the same or different chip or set of chips and other components within network node 1360.

Processing circuitry 1370 can be configured to perform any determining, calculating, or similar operations (e.g., certain obtaining operations) described herein as being provided by a network node. These operations performed by processing circuitry 1370 can include processing information obtained by processing circuitry 1370 by, for example, converting the obtained information into other information, comparing the obtained information or converted information to information stored in the network node, and/or performing one or more operations based on the obtained information or converted information, and as a result of said processing making a determination.

Processing circuitry 1370 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 1360, either alone or in conjunction with other network node 1360 components (e.g., device readable medium 1380). Such functionality can include any of the various wireless features, functions, or benefits discussed herein.

For example, processing circuitry 1370 can execute instructions stored in device readable medium 1380 or in memory within processing circuitry 1370. In some embodiments, processing circuitry 1370 can include a system on a chip (SOC). As a more specific example, instructions (also referred to as a computer program product) stored in medium 1380 can include instructions that, when executed by processing circuitry 1370, can configure network node 1360 to perform operations corresponding to various exemplary methods (e.g., procedures) described herein.

In some embodiments, processing circuitry 1370 can include one or more of radio frequency (RF) transceiver circuitry 1372 and baseband processing circuitry 1374. In some embodiments, radio frequency (RF) transceiver circuitry 1372 and baseband processing circuitry 1374 can be on separate chips (or sets of chips), boards, or units, such as radio units and digital units. In alternative embodiments, part or all of RF transceiver circuitry 1372 and baseband processing circuitry 1374 can be on the same chip or set of chips, boards, or units In certain embodiments, some or all of the functionality described herein as being provided by a network node, base station, eNB or other such network device can be performed by processing circuitry 1370 executing instructions stored on device readable medium 1380 or memory within processing circuitry 1370. In alternative embodiments, some or all of the functionality can be provided by processing circuitry 1370 without executing instructions stored on a separate or discrete device readable medium, such as in a hard-wired manner. In any of those embodiments, whether executing instructions stored on a device readable storage medium or not, processing circuitry 1370 can be configured to perform the described functionality. The benefits provided by such functionality are not limited to processing circuitry 1370 alone or to other components of network node 1360 but are enjoyed by network node 1360 as a whole, and/or by end users and the wireless network generally.

Device readable medium 1380 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1370. Device readable medium 1380 can store any suitable instructions, data or information, including a computer program, software, an application including one or more of logic, rules, code, tables, etc. and/or other instructions capable of being executed by processing circuitry 1370 and, utilized by network node 1360. Device readable medium 1380 can be used to store any calculations made by processing circuitry 1370 and/or any data received via interface 1390. In some embodiments, processing circuitry 1370 and device readable medium 1380 can be considered to be integrated.

Interface 1390 is used in the wired or wireless communication of signaling and/or data between network node 1360, network 1306, and/or WDs 1310. As illustrated, interface 1390 comprises port(s)/terminal(s) 1394 to send and receive data, for example to and from network 1306 over a wired connection. Interface 1390 also includes radio front end circuitry 1392 that can be coupled to, or in certain embodiments a part of, antenna 1362. Radio front end circuitry 1392 comprises filters 1398 and amplifiers 1396. Radio front end circuitry 1392 can be connected to antenna 1362 and processing circuitry 1370. Radio front end circuitry can be configured to condition signals communicated between antenna 1362 and processing circuitry 1370. Radio front end circuitry 1392 can receive digital data that is to be sent out to other network nodes or WDs via a wireless connection. Radio front end circuitry 1392 can convert the digital data into a radio signal having the appropriate channel and bandwidth parameters using a combination of filters 1398 and/or amplifiers 1396. The radio signal can then be transmitted via antenna 1362. Similarly, when receiving data, antenna 1362 can collect radio signals which are then converted into digital data by radio front end circuitry 1392. The digital data can be passed to processing circuitry 1370. In other embodiments, the interface can comprise different components and/or different combinations of components.

In certain alternative embodiments, network node 1360 may not include separate radio front end circuitry 1392, instead, processing circuitry 1370 can comprise radio front end circuitry and can be connected to antenna 1362 without separate radio front end circuitry 1392. Similarly, in some embodiments, all or some of RF transceiver circuitry 1372 can be considered a part of interface 1390. In still other embodiments, interface 1390 can include one or more ports or terminals 1394, radio front end circuitry 1392, and RF transceiver circuitry 1372, as part of a radio unit (not shown), and interface 1390 can communicate with baseband processing circuitry 1374, which is part of a digital unit (not shown).

Antenna 1362 can include one or more antennas, or antenna arrays, configured to send and/or receive wireless signals. Antenna 1362 can be coupled to radio front end circuitry 1390 and can be any type of antenna capable of transmitting and receiving data and/or signals wirelessly. In some embodiments, antenna 1362 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1362 can be separate from network node 1360 and can be connectable to network node 1360 through an interface or port.

Antenna 1362, interface 1390, and/or processing circuitry 1370 can be configured to perform any receiving operations and/or certain obtaining operations described herein as being performed by a network node. Any information, data and/or signals can be received from a wireless device, another network node and/or any other network equipment. Similarly, antenna 1362, interface 1390, and/or processing circuitry 1370 can be configured to perform any transmitting operations described herein as being performed by a network node. Any information, data and/or signals can be transmitted to a wireless device, another network node and/or any other network equipment.

Power circuitry 1387 can comprise, or be coupled to, power management circuitry and can be configured to supply the components of network node 1360 with power for performing the functionality described herein. Power circuitry 1387 can receive power from power source 1386. Power source 1386 and/or power circuitry 1387 can be configured to provide power to the various components of network node 1360 in a form suitable for the respective components (e.g., at a voltage and current level needed for each respective component). Power source 1386 can either be included in, or external to, power circuitry 1387 and/or network node 1360. For example, network node 1360 can be connectable to an external power source (e.g., an electricity outlet) via an input circuitry or interface such as an electrical cable, whereby the external power source supplies power to power circuitry 1387. As a further example, power source 1386 can comprise a source of power in the form of a battery or battery pack which is connected to, or integrated in, power circuitry 1387. The battery can provide backup power should the external power source fail. Other types of power sources, such as photovoltaic devices, can also be used.

Alternative embodiments of network node 1360 can include additional components beyond those shown in FIG. 13 that can be responsible for providing certain aspects of the network node's functionality, including any of the functionality described herein and/or any functionality necessary to support the subject matter described herein. For example, network node 1360 can include user interface equipment to allow and/or facilitate input of information into network node 1360 and to allow and/or facilitate output of information from network node 1360. This can allow and/or facilitate a user (e.g., an authorized employee, agent, etc. of a network operator or an equipment manufacturer) to perform diagnostic, maintenance, repair, and other administrative functions for network node 1360.

In some embodiments, a wireless device (WD, e.g., WD 1310) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1310 includes antenna 1311, interface 1314, processing circuitry 1320, device readable medium 1330, user interface equipment 1332, auxiliary equipment 1334, power source 1336 and power circuitry 1337. WD 1310 can include multiple sets of one or more of the illustrated components for different wireless technologies supported by WD 1310, such as, for example, GSM, WCDMA, LTE, NR, WiFi, WiMAX, or Bluetooth wireless technologies, just to mention a few. These wireless technologies can be integrated into the same or different chips or set of chips as other components within WD 1310.

Antenna 1311 can include one or more antennas or antenna arrays, configured to send and/or receive wireless signals, and is connected to interface 1314. In certain alternative embodiments, antenna 1311 can be separate from WD 1310 and be connectable to WD 1310 through an interface or port. Antenna 1311, interface 1314, and/or processing circuitry 1320 can be configured to perform any receiving or transmitting operations described herein as being performed by a WD. Any information, data and/or signals can be received from a network node and/or another WD. In some embodiments, radio front end circuitry and/or antenna 1311 can be considered an interface.

As illustrated, interface 1314 comprises radio front end circuitry 1312 and antenna 1311. Radio front end circuitry 1312 comprise one or more filters 1318 and amplifiers 1316. Radio front end circuitry 1314 is connected to antenna 1311 and processing circuitry 1320 and can be configured to condition signals communicated between antenna 1311 and processing circuitry 1320. Radio front end circuitry 1312 can be coupled to or a part of antenna 1311. In some embodiments, WD 1310 may not include separate radio front end circuitry 1312; rather, processing circuitry 1320 can comprise radio front end circuitry and can be connected to antenna 1311. Similarly, in some embodiments, some or all of RF transceiver circuitry 1322 can be considered a part of interface 1314. Radio front end circuitry 1312 can receive digital data that is to be sent out to other network nodes or WDs via a wireless connection. Radio front end circuitry 1312 can convert the digital data into a radio signal having the appropriate channel and bandwidth parameters using a combination of filters 1318 and/or amplifiers 1316. The radio signal can then be transmitted via antenna 1311. Similarly, when receiving data, antenna 1311 can collect radio signals which are then converted into digital data by radio front end circuitry 1312. The digital data can be passed to processing circuitry 1320. In other embodiments, the interface can comprise different components and/or different combinations of components.

Processing circuitry 1320 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 1310 functionality either alone or in combination with other WD 1310 components, such as device readable medium 1330. Such functionality can include any of the various wireless features or benefits discussed herein.

For example, processing circuitry 1320 can execute instructions stored in device readable medium 1330 or in memory within processing circuitry 1320 to provide the functionality disclosed herein. More specifically, instructions (also referred to as a computer program product) stored in medium 1330 can include instructions that, when executed by processor 1320, can configure wireless device 1310 to perform operations corresponding to various exemplary methods (e.g., procedures) described herein.

As illustrated, processing circuitry 1320 includes one or more of RF transceiver circuitry 1322, baseband processing circuitry 1324, and application processing circuitry 1326. In other embodiments, the processing circuitry can comprise different components and/or different combinations of components. In certain embodiments processing circuitry 1320 of WD 1310 can comprise a SOC. In some embodiments, RF transceiver circuitry 1322, baseband processing circuitry 1324, and application processing circuitry 1326 can be on separate chips or sets of chips. In alternative embodiments, part or all of baseband processing circuitry 1324 and application processing circuitry 1326 can be combined into one chip or set of chips, and RF transceiver circuitry 1322 can be on a separate chip or set of chips. In still alternative embodiments, part or all of RF transceiver circuitry 1322 and baseband processing circuitry 1324 can be on the same chip or set of chips, and application processing circuitry 1326 can be on a separate chip or set of chips. In yet other alternative embodiments, part or all of RF transceiver circuitry 1322, baseband processing circuitry 1324, and application processing circuitry 1326 can be combined in the same chip or set of chips. In some embodiments, RF transceiver circuitry 1322 can be a part of interface 1314. RF transceiver circuitry 1322 can condition RF signals for processing circuitry 1320.

In certain embodiments, some or all of the functionality described herein as being performed by a WD can be provided by processing circuitry 1320 executing instructions stored on device readable medium 1330, which in certain embodiments can be a computer-readable storage medium. In alternative embodiments, some or all of the functionality can be provided by processing circuitry 1320 without executing instructions stored on a separate or discrete device readable storage medium, such as in a hard-wired manner. In any of those particular embodiments, whether executing instructions stored on a device readable storage medium or not, processing circuitry 1320 can be configured to perform the described functionality. The benefits provided by such functionality are not limited to processing circuitry 1320 alone or to other components of WD 1310, but are enjoyed by WD 1310 as a whole, and/or by end users and the wireless network generally.

Processing circuitry 1320 can be configured to perform any determining, calculating, or similar operations (e.g., certain obtaining operations) described herein as being performed by a WD. These operations, as performed by processing circuitry 1320, can include processing information obtained by processing circuitry 1320 by, for example, converting the obtained information into other information, comparing the obtained information or converted information to information stored by WD 1310, and/or performing one or more operations based on the obtained information or converted information, and as a result of said processing making a determination.

Device readable medium 1330 can be operable to store a computer program, software, an application including one or more of logic, rules, code, tables, etc. and/or other instructions capable of being executed by processing circuitry 1320. Device readable medium 1330 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1320. In some embodiments, processing circuitry 1320 and device readable medium 1330 can be considered to be integrated.

User interface equipment 1332 can include components that allow and/or facilitate a human user to interact with WD 1310. Such interaction can be of many forms, such as visual, audial, tactile, etc. User interface equipment 1332 can be operable to produce output to the user and to allow and/or facilitate the user to provide input to WD 1310. The type of interaction can vary depending on the type of user interface equipment 1332 installed in WD 1310. For example, if WD 1310 is a smart phone, the interaction can be via a touch screen; if WD 1310 is a smart meter, the interaction can be through a screen that provides usage (e.g., the number of gallons used) or a speaker that provides an audible alert (e.g., if smoke is detected). User interface equipment 1332 can include input interfaces, devices and circuits, and output interfaces, devices and circuits. User interface equipment 1332 can be configured to allow and/or facilitate input of information into WD 1310 and is connected to processing circuitry 1320 to allow and/or facilitate processing circuitry 1320 to process the input information. User interface equipment 1332 can include, for example, a microphone, a proximity or other sensor, keys/buttons, a touch display, one or more cameras, a USB port, or other input circuitry. User interface equipment 1332 is also configured to allow and/or facilitate output of information from WD 1310, and to allow and/or facilitate processing circuitry 1320 to output information from WD 1310. User interface equipment 1332 can include, for example, a speaker, a display, vibrating circuitry, a USB port, a headphone interface, or other output circuitry. Using one or more input and output interfaces, devices, and circuits, of user interface equipment 1332, WD 1310 can communicate with end users and/or the wireless network and allow and/or facilitate them to benefit from the functionality described herein.

Auxiliary equipment 1334 is operable to provide more specific functionality which may not be generally performed by WDs. This can comprise specialized sensors for doing measurements for various purposes, interfaces for additional types of communication such as wired communications etc. The inclusion and type of components of auxiliary equipment 1334 can vary depending on the embodiment and/or scenario.

Power source 1336 can, in some embodiments, be in the form of a battery or battery pack. Other types of power sources, such as an external power source (e.g., an electricity outlet), photovoltaic devices or power cells, can also be used. WD 1310 can further comprise power circuitry 1337 for delivering power from power source 1336 to the various parts of WD 1310 which need power from power source 1336 to carry out any functionality described or indicated herein. Power circuitry 1337 can in certain embodiments comprise power management circuitry. Power circuitry 1337 can additionally or alternatively be operable to receive power from an external power source; in which case WD 1310 can be connectable to the external power source (such as an electricity outlet) via input circuitry or an interface such as an electrical power cable. Power circuitry 1337 can also in certain embodiments be operable to deliver power from an external power source to power source 1336. This can be, for example, for the charging of power source 1336. Power circuitry 1337 can perform any converting or other modification to the power from power source 1336 to make it suitable for supply to the respective components of WD 1310.

Figure 14:
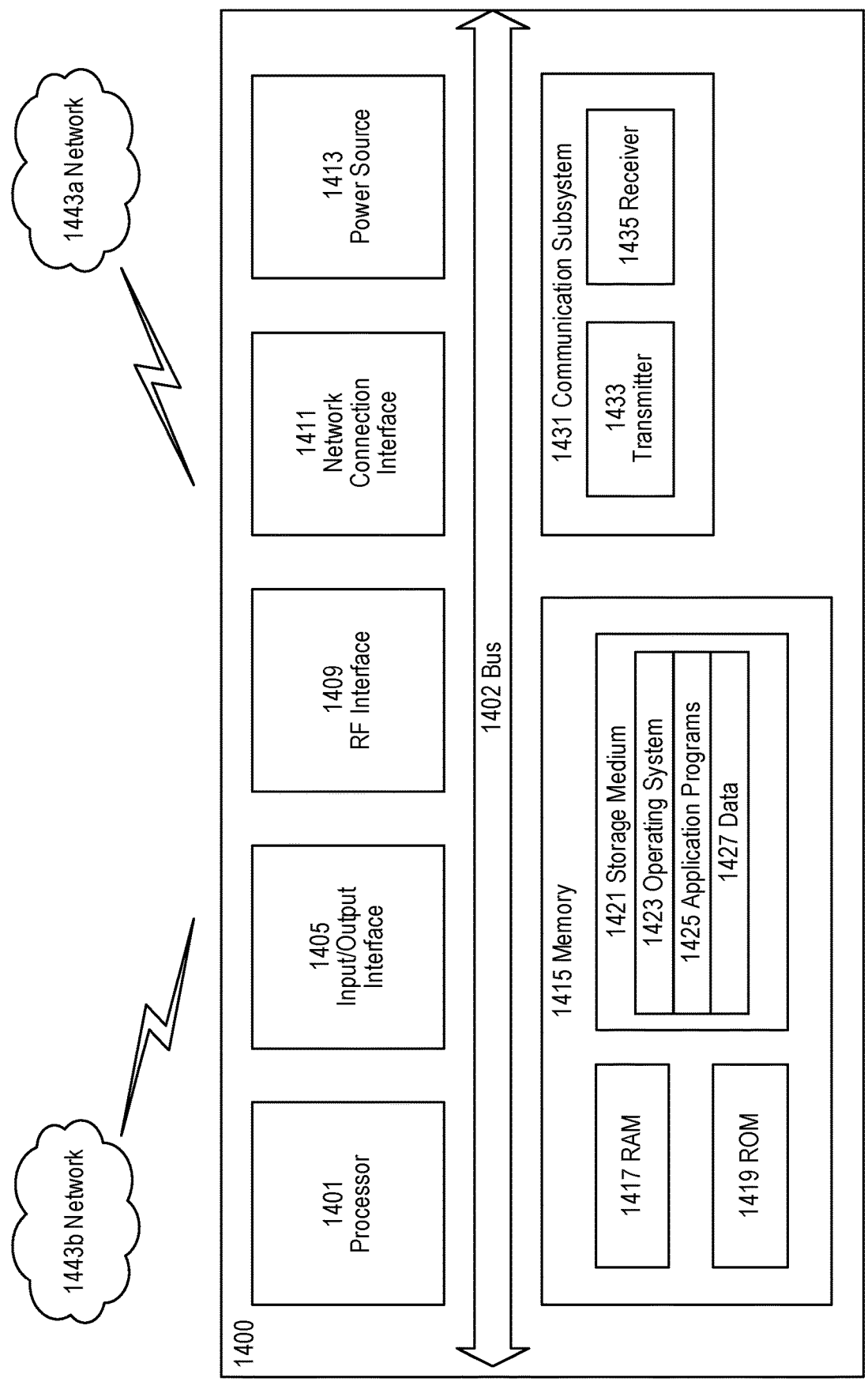
FIG. 14 shows an exemplary embodiment of a UE, according to various exemplary embodiments of the present disclosure.

FIG. 14 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 14200 can be any UE identified by the $3^{rd}$ Generation Partnership Project (3GPP), including a NB-IoT UE, a machine type communication (MTC) UE, and/or an enhanced MTC (eMTC) UE. UE 1400, as illustrated in FIG. 14, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 14 is a UE, the components discussed herein are equally applicable to a WD, and vice-versa.

In FIG. 14, UE 1400 includes processing circuitry 1401 that is operatively coupled to input/output interface 1405, radio frequency (RF) interface 1409, network connection interface 1411, memory 1415 including random access memory (RAM) 1417, read-only memory (ROM) 1419, and storage medium 1421 or the like, communication subsystem 1431, power source 1433, and/or any other component, or any combination thereof. Storage medium 1421 includes operating system 1423, application program 1425, and data 1427. In other embodiments, storage medium 1421 can include other similar types of information. Certain UEs can utilize all of the components shown in FIG. 14, or only a subset of the components. The level of integration between the components can vary from one UE to another UE. Further, certain UEs can contain multiple instances of a component, such as multiple processors, memories, transceivers, transmitters, receivers, etc.

In FIG. 14, processing circuitry 1401 can be configured to process computer instructions and data. Processing circuitry 1401 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1401 can include two central processing units (CPUs). Data can be information in a form suitable for use by a computer.

In the depicted embodiment, input/output interface 1405 can be configured to provide a communication interface to an input device, output device, or input and output device. UE 1400 can be configured to use an output device via input/output interface 1405. An output device can use the same type of interface port as an input device. For example, a USB port can be used to provide input to and output from UE 1400. The output device can be a speaker, a sound card, a video card, a display, a monitor, a printer, an actuator, an emitter, a smartcard, another output device, or any combination thereof. UE 1400 can be configured to use an input device via input/output interface 1405 to allow and/or facilitate a user to capture information into UE 1400. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 14, RF interface 1409 can be configured to provide a communication interface to RF components such as a transmitter, a receiver, and an antenna. Network connection interface 1411 can be configured to provide a communication interface to network 1443*a*. Network 1443*a* can encompass wired and/or wireless networks such as a local-area network (LAN), a wide-area network (WAN), a computer network, a wireless network, a telecommunications network, another like network or any combination thereof. For example, network 1443*a* can comprise a Wi-Fi network. Network connection interface 1411 can be configured to include a receiver and a transmitter interface used to communicate with one or more other devices over a communication network according to one or more communication protocols, such as Ethernet, TCP/IP, SONET, ATM, or the like. Network connection interface 1411 can implement receiver and transmitter functionality appropriate to the communication network links (e.g., optical, electrical, and the like). The transmitter and receiver functions can share circuit components, software or firmware, or alternatively can be implemented separately.

RAM 1417 can be configured to interface via bus 1402 to processing circuitry 1401 to provide storage or caching of data or computer instructions during the execution of software programs such as the operating system, application programs, and device drivers. ROM 1419 can be configured to provide computer instructions or data to processing circuitry 1401. For example, ROM 1419 can be configured to store invariant low-level system code or data for basic system functions such as basic input and output (I/O), startup, or reception of keystrokes from a keyboard that are stored in a non-volatile memory. Storage medium 1421 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 1421 can be configured to include operating system 1423; application program 1425 such as a web browser application, a widget or gadget engine or another application; and data file 1427. Storage medium 1421 can store, for use by UE 1400, any of a variety of various operating systems or combinations of operating systems. For example, application program 1425 can include executable program instructions (also referred to as a computer program product) that, when executed by processor 1401, can configure UE 1400 to perform operations corresponding to various exemplary methods (e.g., procedures) described herein.

Storage medium 1421 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1421 can allow and/or facilitate UE 1400 to access computer-executable instructions, application programs or the like, stored on transitory or non-transitory memory media, to off-load data, or to upload data. An article of manufacture, such as one utilizing a communication system can be tangibly embodied in storage medium 1421, which can comprise a device readable medium.

In FIG. 14, processing circuitry 1401 can be configured to communicate with network 1443*b* using communication subsystem 1431. Network 1443*a* and network 1443*b* can be the same network or networks or different network or networks. Communication subsystem 1431 can be configured to include one or more transceivers used to communicate with network 1443*b*. For example, communication subsystem 1431 can be configured to include one or more transceivers used to communicate with one or more remote transceivers of another device capable of wireless communication such as another WD, UE, or base station of a radio access network (RAN) according to one or more communication protocols, such as IEEE 802.14, CDMA, WCDMA, GSM, LTE, UTRAN, WiMax, or the like. Each transceiver can include transmitter 1433 and/or receiver 1435 to implement transmitter or receiver functionality, respectively, appropriate to the RAN links (e.g., frequency allocations and the like). Further, transmitter 1433 and receiver 1435 of each transceiver can share circuit components, software or firmware, or alternatively can be implemented separately.

In the illustrated embodiment, the communication functions of communication subsystem 1431 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1431 can include cellular communication, Wi-Fi communication, Bluetooth communication, and GPS communication. Network 1443*b* can encompass wired and/or wireless networks such as a local-area network (LAN), a wide-area network (WAN), a computer network, a wireless network, a telecommunications network, another like network or any combination thereof. For example, network 1443*b* can be a cellular network, a Wi-Fi network, and/or a near-field network. Power source 1413 can be configured to provide alternating current (AC) or direct current (DC) power to components of UE 1400.

The features, benefits and/or functions described herein can be implemented in one of the components of UE 1400 or partitioned across multiple components of UE 1400. Further, the features, benefits, and/or functions described herein can be implemented in any combination of hardware, software or firmware. In one example, communication subsystem 1431 can be configured to include any of the components described herein. Further, processing circuitry 1401 can be configured to communicate with any of such components over bus 1402. In another example, any of such components can be represented by program instructions stored in memory that when executed by processing circuitry 1401 perform the corresponding functions described herein. In another example, the functionality of any of such components can be partitioned between processing circuitry 1401 and communication subsystem 1431. In another example, the non-computationally intensive functions of any of such components can be implemented in software or firmware and the computationally intensive functions can be implemented in hardware.

Figure 15:
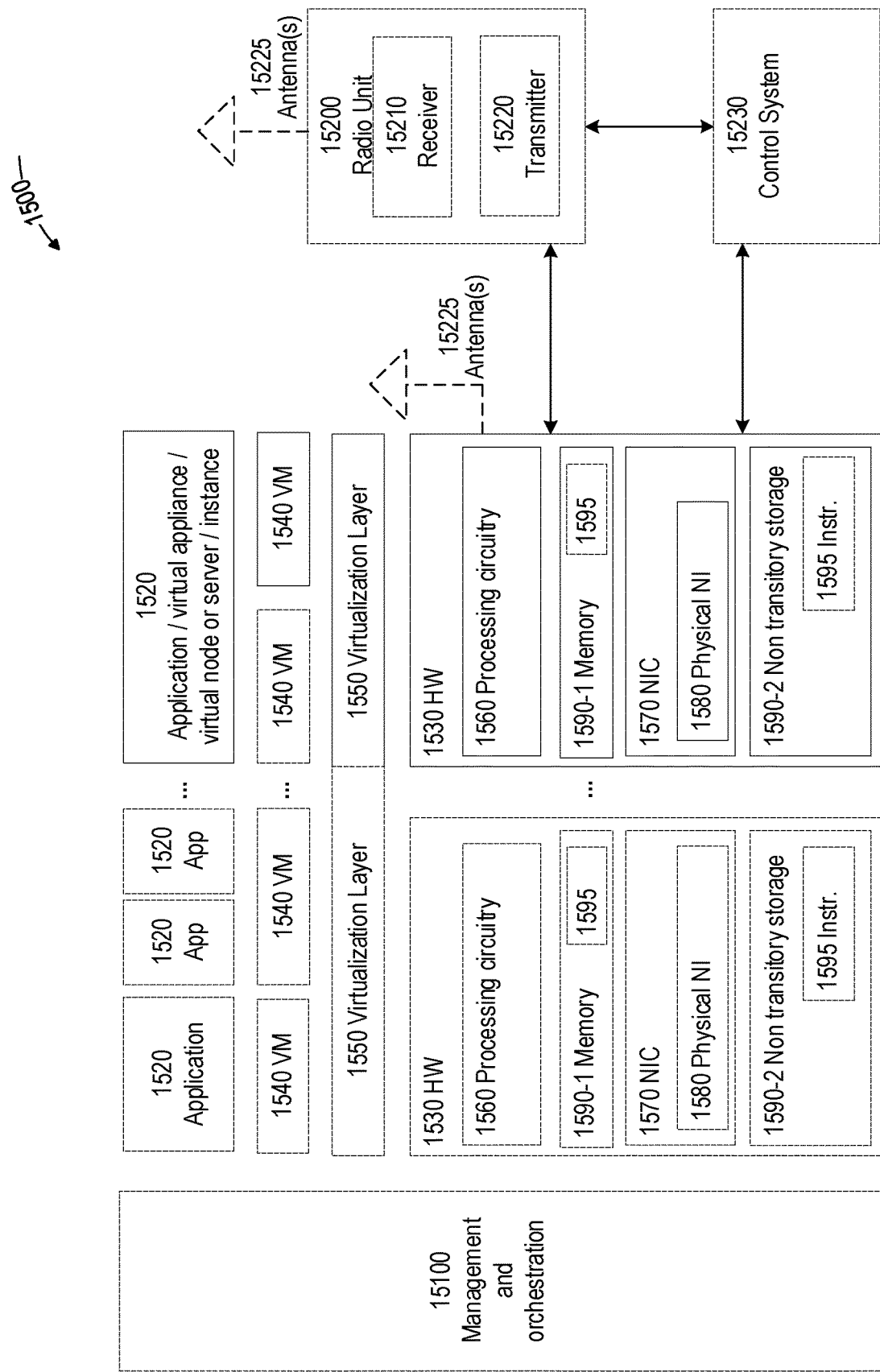
FIG. 15 is a block diagram illustrating an exemplary virtualization environment usable for implementation of various embodiments of network nodes described herein.

FIG. 15 is a schematic block diagram illustrating a virtualization environment 1500 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1500 hosted by one or more of hardware nodes 1530. Further, in embodiments in which the virtual node is not a radio access node or does not require radio connectivity (e.g., a core network node), then the network node can be entirely virtualized.

The functions can be implemented by one or more applications 1520 (which can alternatively be called software instances, virtual appliances, network functions, virtual nodes, virtual network functions, etc.) operative to implement some of the features, functions, and/or benefits of some of the embodiments disclosed herein. Applications 1520 are run in virtualization environment 1500 which provides hardware 1530 comprising processing circuitry 1560 and memory 1590. Memory 1590 contains instructions 1595 executable by processing circuitry 1560 whereby application 1520 is operative to provide one or more of the features, benefits, and/or functions disclosed herein.

Virtualization environment 1500 can include general-purpose or special-purpose network hardware devices (or nodes) 1530 comprising a set of one or more processors or processing circuitry 1560, which can be commercial off-the-shelf (COTS) processors, dedicated Application Specific Integrated Circuits (ASICs), or any other type of processing circuitry including digital or analog hardware components or special purpose processors. Each hardware device can comprise memory 1590-1 which can be non-persistent memory for temporarily storing instructions 1595 or software executed by processing circuitry 1560. For example, instructions 1595 can include program instructions (also referred to as a computer program product) that, when executed by processing circuitry 1560, can configure hardware node 1520 to perform operations corresponding to various exemplary methods (e.g., procedures) described herein. Such operations can also be attributed to virtual node(s) 1520 that is/are hosted by hardware node 1530.

Each hardware device can comprise one or more network interface controllers (NICs) 1570, also known as network interface cards, which include physical network interface 1580. Each hardware device can also include non-transitory, persistent, machine-readable storage media 1590-2 having stored therein software 1595 and/or instructions executable by processing circuitry 1560. Software 1595 can include any type of software including software for instantiating one or more virtualization layers 1550 (also referred to as hypervisors), software to execute virtual machines 1540 as well as software allowing it to execute functions, features and/or benefits described in relation with some embodiments described herein.

Virtual machines 1540, comprise virtual processing, virtual memory, virtual networking or interface and virtual storage, and can be run by a corresponding virtualization layer 1550 or hypervisor. Different embodiments of the instance of virtual appliance 1520 can be implemented on one or more of virtual machines 1540, and the implementations can be made in different ways.

During operation, processing circuitry 1560 executes software 1595 to instantiate the hypervisor or virtualization layer 1550, which can sometimes be referred to as a virtual machine monitor (VMM). Virtualization layer 1550 can present a virtual operating platform that appears like networking hardware to virtual machine 1540.

As shown in FIG. 15, hardware 1530 can be a standalone network node with generic or specific components. Hardware 1530 can comprise antenna 15225 and can implement some functions via virtualization. Alternatively, hardware 1530 can be part of a larger cluster of hardware (e.g., such as in a data center or customer premise equipment (CPE)) where many hardware nodes work together and are managed via management and orchestration (MANO) 15100, which, among others, oversees lifecycle management of applications 1520.

Virtualization of the hardware is in some contexts referred to as network function virtualization (NFV). NFV can be used to consolidate many network equipment types onto industry standard high-volume server hardware, physical switches, and physical storage, which can be located in data centers, and customer premise equipment. NFV can also be used in connection with cloud-based infrastructure.

In the context of NFV, virtual machine 1540 can be a software implementation of a physical machine that runs programs as if they were executing on a physical, non-virtualized machine. Each of virtual machines 1540, and that part of hardware 1530 that executes that virtual machine, be it hardware dedicated to that virtual machine and/or hardware shared by that virtual machine with others of the virtual machines 1540, forms a separate virtual network elements (VNE).

Still in the context of NFV, Virtual Network Function (VNF) is responsible for handling specific network functions that run in one or more virtual machines 1540 on top of hardware networking infrastructure 1530 and corresponds to application 1520 in FIG. 15.

In some embodiments, one or more radio units 15200 that each include one or more transmitters 15220 and one or more receivers 15210 can be coupled to one or more antennas 15225. Radio units 15200 can communicate directly with hardware nodes 1530 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 15230, which can alternatively be used for communication between the hardware nodes 1530 and radio units 15200.

Figure 16:
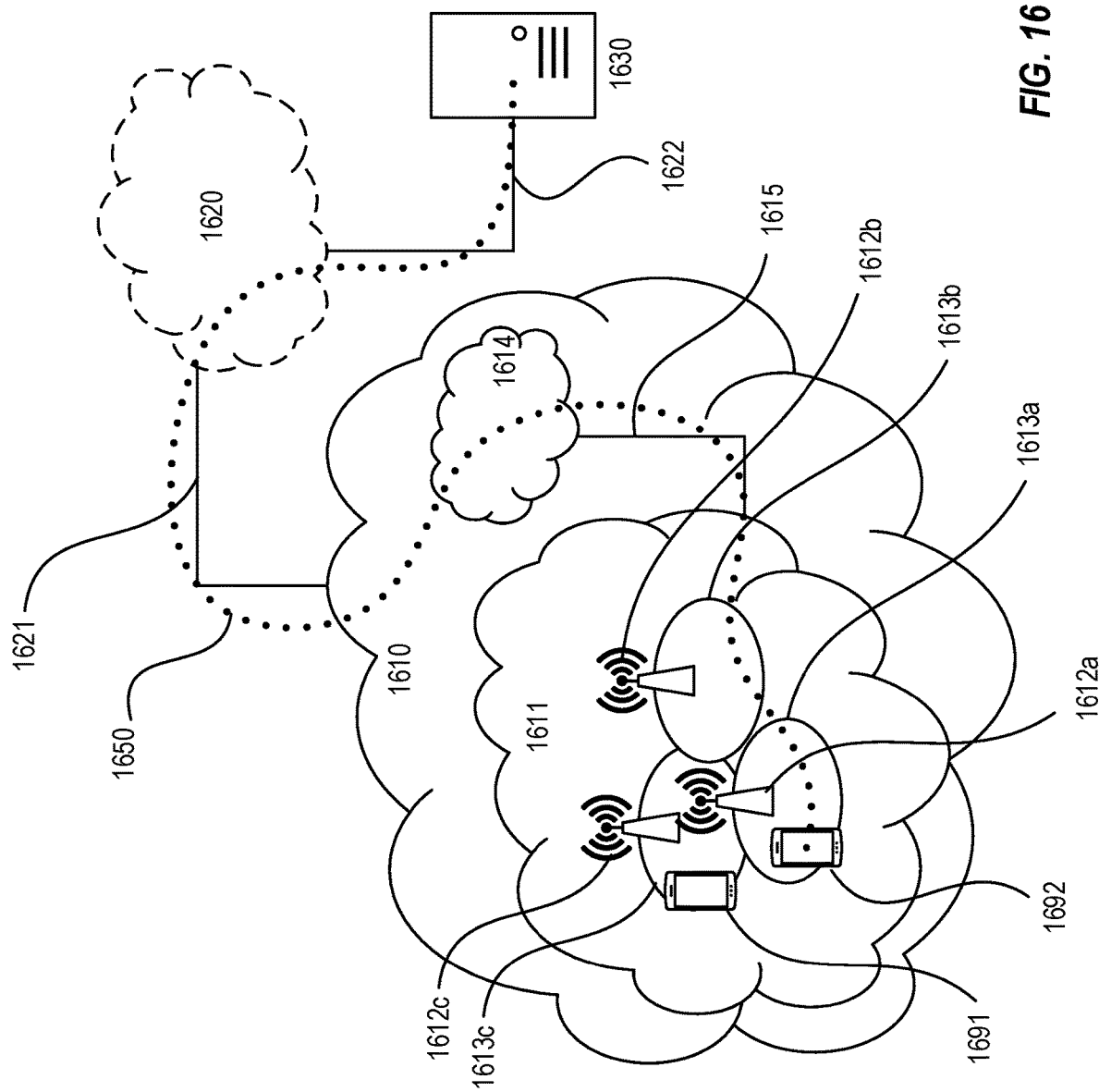
FIGS. 16-17 are block diagrams of various exemplary communication systems and/or networks, according to various exemplary embodiments of the present disclosure.

With reference to FIG. 16, in accordance with an embodiment, a communication system includes telecommunication network 1610, such as a 3GPP-type cellular network, which comprises access network 1611, such as a radio access network, and core network 1614. Access network 1611 comprises a plurality of base stations 1612a, 1612b, 1612c, such as NBs, eNBs, gNBs or other types of wireless access points, each defining a corresponding coverage area 1613a, 1613b, 1613c. Each base station 1612a, 1612b, 1612c is connectable to core network 1614 over a wired or wireless connection 1615. A first UE 1691 located in coverage area 1613c can be configured to wirelessly connect to, or be paged by, the corresponding base station 1612c. A second UE 1692 in coverage area 1613a is wirelessly connectable to the corresponding base station 1612a. While a plurality of UEs 1691, 1692 are illustrated in this example, the disclosed embodiments are equally applicable to a situation where a sole UE is in the coverage area or where a sole UE is connecting to the Telecommunication network 1610 is itself connected to host computer 1630, which can be embodied in the hardware and/or software of a standalone server, a cloud-implemented server, a distributed server or as processing resources in a server farm. Host computer 1630 can be under the ownership or control of a service provider or can be operated by the service provider or on behalf of the service provider. Connections 1621 and 1622 between telecommunication network 1610 and host computer 1630 can extend directly from core network 1614 to host computer 1630 or can go via an optional intermediate network 1620. Intermediate network 1620 can be one of, or a combination of more than one of, a public, private or hosted network; intermediate network 1620, if any, can be a backbone network or the Internet; in particular, intermediate network 1620 can comprise two or more sub-networks (not shown).

The communication system of FIG. 16 as a whole enables connectivity between the connected UEs 1691, 1692 and host computer 1630. The connectivity can be described as an over-the-top (OTT) connection 1650. Host computer 1630 and the connected UEs 1691, 1692 are configured to communicate data and/or signaling via OTT connection 1650, using access network 1611, core network 1614, any intermediate network 1620 and possible further infrastructure (not shown) as intermediaries. OTT connection 1650 can be transparent in the sense that the participating communication devices through which OTT connection 1650 passes are unaware of routing of uplink and downlink communications. For example, base station 1612 may not or need not be informed about the past routing of an incoming downlink communication with data originating from host computer 1630 to be forwarded (e.g., handed over) to a connected UE 1691. Similarly, base station 1612 need not be aware of the future routing of an outgoing uplink communication originating from the UE 1691 towards the host computer 1630.

Example implementations, in accordance with an embodiment, of the UE, base station and host computer discussed in the preceding paragraphs will now be described with reference to FIG. 17. In communication system 1700, host computer 1710 comprises hardware 1715 including communication interface 1716 configured to set up and maintain a wired or wireless connection with an interface of a different communication device of communication system 1700. Host computer 1710 further comprises processing circuitry 1718, which can have storage and/or processing capabilities. In particular, processing circuitry 1718 can comprise one or more programmable processors, application-specific integrated circuits, field programmable gate arrays or combinations of these (not shown) adapted to execute instructions. Host computer 1710 further comprises software 1711, which is stored in or accessible by host computer 1710 and executable by processing circuitry 1718. Software 1711 includes host application 1712. Host application 1712 can be operable to provide a service to a remote user, such as UE 1730 connecting via OTT connection 1750 terminating at UE 1730 and host computer 1710. In providing the service to the remote user, host application 1712 can provide user data which is transmitted using OTT connection 1750.

Communication system 1700 can also include base station 1720 provided in a telecommunication system and comprising hardware 1725 enabling it to communicate with host computer 1710 and with UE 1730. Hardware 1725 can include communication interface 1726 for setting up and maintaining a wired or wireless connection with an interface of a different communication device of communication system 1700, as well as radio interface 1727 for setting up and maintaining at least wireless connection 1770 with UE 1730 located in a coverage area (not shown in FIG. 17) served by base station 1720. Communication interface 1726 can be configured to facilitate connection 1760 to host computer 1710. Connection 1760 can be direct, or it can pass through a core network (not shown in FIG. 17) of the telecommunication system and/or through one or more intermediate networks outside the telecommunication system. In the embodiment shown, hardware 1725 of base station 1720 can also include processing circuitry 1728, which can comprise one or more programmable processors, application-specific integrated circuits, field programmable gate arrays or combinations of these (not shown) adapted to execute instructions.

Base station 1720 also includes software 1721 stored internally or accessible via an external connection. For example, software 1721 can include program instructions (also referred to as a computer program product) that, when executed by processing circuitry 1728, can configure base station 1720 to perform operations corresponding to various exemplary methods (e.g., procedures) described herein.

Communication system 1700 can also include UE 1730 already referred to, whose hardware 1735 can include radio interface 1737 configured to set up and maintain wireless connection 1770 with a base station serving a coverage area in which UE 1730 is currently located. Hardware 1735 of UE 1730 can also include processing circuitry 1738, which can comprise one or more programmable processors, application-specific integrated circuits, field programmable gate arrays or combinations of these (not shown) adapted to execute instructions.

UE 1730 also includes software 1731, which is stored in or accessible by UE 1730 and executable by processing circuitry 1738. Software 1731 includes client application 1732. Client application 1732 can be operable to provide a service to a human or non-human user via UE 1730, with the support of host computer 1710. In host computer 1710, an executing host application 1712 can communicate with the executing client application 1732 via OTT connection 1750 terminating at UE 1730 and host computer 1710. In providing the service to the user, client application 1732 can receive request data from host application 1712 and provide user data in response to the request data. OTT connection 1750 can transfer both the request data and the user data. Client application 1732 can interact with the user to generate the user data that it provides. Software 1731 can also include program instructions (also referred to as a computer program product) that, when executed by processing circuitry 1738, can configure UE 1730 to perform operations corresponding to various exemplary methods (e.g., procedures) described herein.

Figure 17:
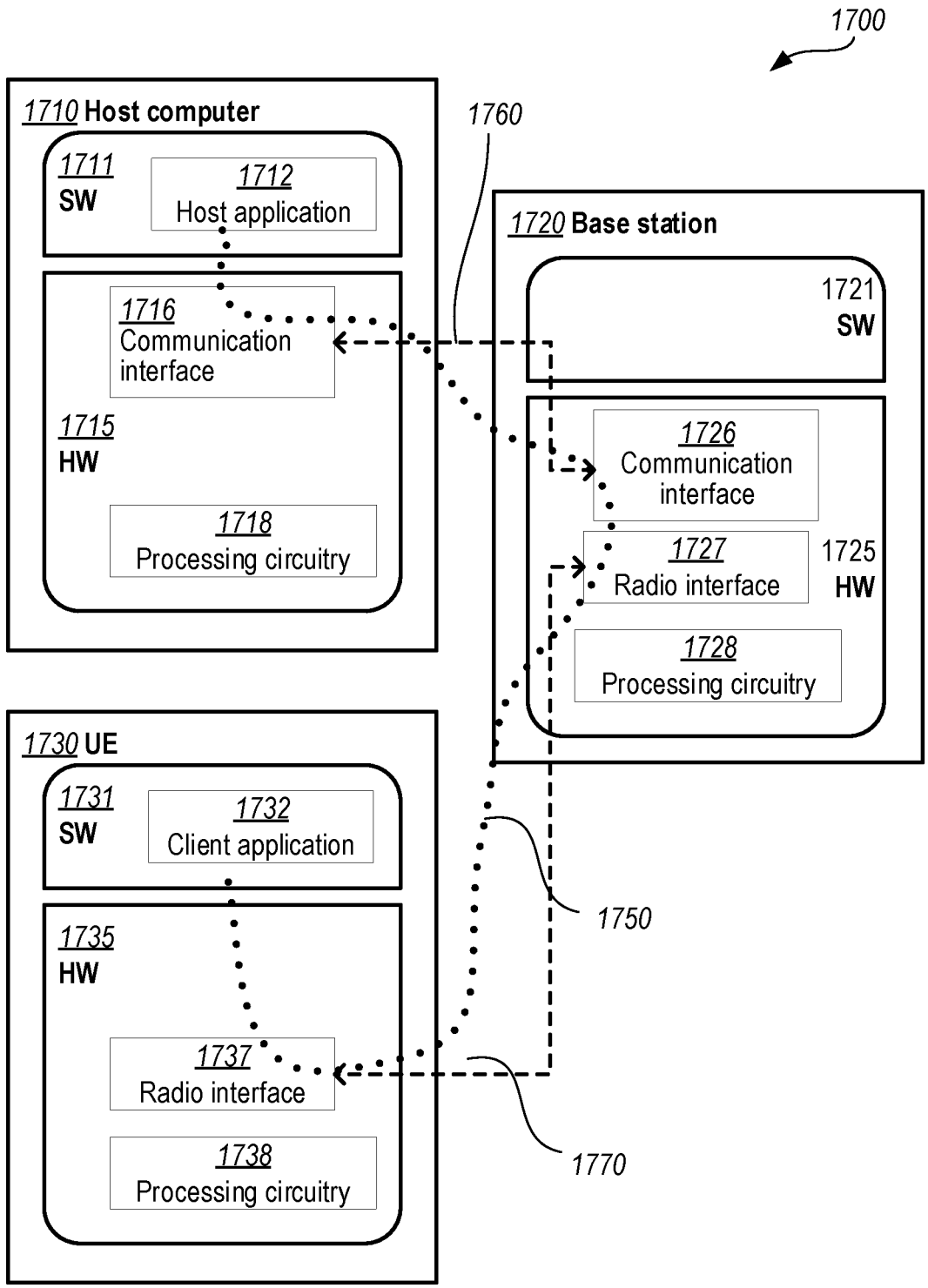

It is noted that host computer 1710, base station 1720 and UE 1730 illustrated in FIG. 17 can be similar or identical to host computer 1230, one of base stations 1712a, 1712b, 1712c and one of UEs 1791, 1792 of FIG. 17, respectively. This is to say, the inner workings of these entities can be as shown in FIG. 17 and independently, the surrounding network topology can be that of FIG. 17.

In FIG. 17, OTT connection 1750 has been drawn abstractly to illustrate the communication between host computer 1710 and UE 1730 via base station 1720, without explicit reference to any intermediary devices and the precise routing of messages via these devices. Network infrastructure can determine the routing, which it can be configured to hide from UE 1730 or from the service provider operating host computer 1710, or both. While OTT connection 1750 is active, the network infrastructure can further take decisions by which it dynamically changes the routing (e.g., on the basis of load balancing consideration or reconfiguration of the network).

Wireless connection 1770 between UE 1730 and base station 1720 is in accordance with the teachings of the embodiments described throughout this disclosure. One or more of the various embodiments improve the performance of OTT services provided to UE 1730 using OTT connection 1750, in which wireless connection 1770 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1750 between host computer 1710 and UE 1730, in response to variations in the measurement results. The measurement procedure and/or the network functionality for reconfiguring OTT connection 1750 can be implemented in software 1711 and hardware 1715 of host computer 1710 or in software 1731 and hardware 1735 of UE 1730, or both. In embodiments, sensors (not shown) can be deployed in or in association with communication devices through which OTT connection 1750 passes; the sensors can participate in the measurement procedure by supplying values of the monitored quantities exemplified above, or supplying values of other physical quantities from which software 1711, 1731 can compute or estimate the monitored quantities. The reconfiguring of OTT connection 1750 can include message format, retransmission settings, preferred routing etc.; the reconfiguring need not affect base station 1720, and it can be unknown or imperceptible to base station 1720. Such procedures and functionalities can be known and practiced in the art. In certain embodiments, measurements can involve proprietary UE signaling facilitating host computer 1710's measurements of throughput, propagation times, latency and the like. The measurements can be implemented in that software 1711 and 1731 causes messages to be transmitted, in particular empty or 'dummy' messages, using OTT connection 1750 while it monitors propagation times, errors, etc.

FIG. 18 is a flowchart illustrating an exemplary method and/or procedure implemented in a communication system, in accordance with one embodiment. The communication system includes a host computer, a base station and a UE which, in some exemplary embodiments, can be those described with reference to other figures herein. For simplicity of the present disclosure, only drawing references to FIG. 18 will be included in this section. In step 1810, the host computer provides user data. In substep 1811 (which can be optional) of step 1810, the host computer provides the user data by executing a host application. In step 1820, the host computer initiates a transmission carrying the user data to the UE. In step 1830 (which can be optional), the base station transmits to the UE the user data which was carried in the transmission that the host computer initiated, in accordance with the teachings of the embodiments described throughout this disclosure. In step 1840 (which can also be optional), the UE executes a client application associated with the host application executed by the host computer.

FIG. 19 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 19 will be included in this section. In step 1910 of the method, the host computer provides user data. In an optional substep (not shown) the host computer provides the user data by executing a host application. In step 1920, the host computer initiates a transmission carrying the user data to the UE. The transmission can pass via the base station, in accordance with the teachings of the embodiments described throughout this disclosure. In step 1930 (which can be optional), the UE receives the user data carried in the transmission.

FIG. 20 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 20 will be included in this section. In step 2010 (which can be optional), the UE receives input data provided by the host computer. Additionally or alternatively, in step 2020, the UE provides user data. In substep 2021 (which can be optional) of step 2020, the UE provides the user data by executing a client application. In substep 2011 (which can be optional) of step 2010, the UE executes a client application which provides the user data in reaction to the received input data provided by the host computer. In providing the user data, the executed client application can further consider user input received from the user. Regardless of how the user data was provided, the UE initiates, in substep 2030 (which can be optional), transmission of the user data to the host computer. In step 2040 of the method, the host computer receives the user data transmitted from the UE, in accordance with the teachings of the embodiments described throughout this disclosure.

FIG. 21 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 21 will be included in this section. In step 2110 (which can be optional), in accordance with the teachings of the embodiments described throughout this disclosure, the base station receives user data from the UE. In step 2120 (which can be optional), the base station initiates transmission of the received user data to the host computer. In step 2130 (which can be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software.

In addition, a device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. As such, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the present disclosure also include, but are not limited to, the following enumerated examples:

A1. A method, performed by a centralized unit (CU), for establishing backhaul channels in an integrated access backhaul (IAB) network, the method comprising:
  determining a first identifier of a first backhaul radio link control (BH RLC) channel between first and second nodes in an IAB network, the second node being downstream in relation to the first node; and
  sending, to the second node, a second request to setup a second BH RLC channel between the second node and a third node in the IAB network, wherein:
    the third node is downstream in relation to the second node; and
    the second request includes the first identifier for association with the second BH RLC channel.

A2. The method of embodiment A1, wherein at least one data radio bearer (DRB) between a user equipment (UE) and the CU is associated with both the first and second BH RLC channels.

A3. The method of any of embodiments A1-A2, wherein determining the first identifier comprises receiving the first identifier from the first node in response to a first request to setup the first BH RLC channel.

A4. The method of embodiment A3, wherein:
  the first identifier is received from a distributed unit (DU) associated with the first node; and
  the second request is sent to a DU associated with the second node.

A5. The method of any of embodiments A1-A4, further comprising:
  receiving, from the second node, a second identifier of the second BH RLC channel; and
  sending, to the third node, a third request to setup a third BH RLC channel between the third node and a fourth node in the IAB network, wherein:
    the fourth node is downstream in relation to the third node; and
    the third request includes the second identifier for association with the third BH RLC channel.

A6. The method of any of embodiments A1-A2, wherein determining the first identifier comprises selecting the first identifier from a pool of available BH RLC identifiers.

A7. The method of embodiment A6, further comprising sending, to the first node, a first request to setup the first BH RLC channel between the first node and the second node, wherein the first request includes the first identifier for association with the first BH RLC channel.

B1. A method, performed by an intermediate node, for establishing backhaul channels in an integrated access backhaul (IAB) network, the method comprising:
  receiving, from a centralized unit (CU) in the IAB network, a request to setup a second backhaul radio link control (BH RLC) channel between the intermediate node and a downstream node in the IAB network;
  assigning a second identifier to the second BH RLC channel;
  receiving a first identifier associated with a first BH RLC channel between the intermediate node and an upstream node in the IAB network; and
  associating both the first identifier and the second identifier with a data radio bearer (DRB) between a user equipment (UE) and the CU.

B2. The method of embodiment B1, further comprising forwarding a data packet, associated with the DRB, received via one of the first and second BH RLC channels for transmission via the other of the first and second BH RLC channels.

B3. The method of any of embodiments B1-B2, wherein:
  the first identifier is received in the request; and assigning the second identifier comprises selecting the second identifier from a pool of available BH RLC identifiers.

B4. The method of embodiment B3, further comprising sending, the CU, a response to the request to setup the second BH RLC channel, wherein the response includes the second identifier.

B5. The method of any of embodiments B1-B2, wherein assigning a second identifier to the second BH RLC channel comprises assigning the received first identifier to the second BH RLC channel.

B6. The method of any of embodiments B1-B2, wherein both the first identifier and the second identifier are received in the request.

C1. A centralized unit (CU) configured for operation in an integrated access backhaul (IAB) network, the CU comprising:
  interface circuitry configured to communicate with one or more distributed units (DUs); and
  processing circuitry operably coupled to the radio interface circuitry, whereby the processing circuitry and radio interface circuitry are configured to perform operations corresponding to any of the methods of embodiments A1-A7.

C2. A centralized unit (CU) configured for operation in an integrated access backhaul (IAB) network, the CU being further arranged to perform operations corresponding to any of the methods of embodiments A1-A7.

C3. A non-transitory, computer-readable medium storing computer-executable instructions that, when executed by processing circuitry of a centralized unit (CU) configured for operation in an integrated access backhaul (IAB) network, configure the CU to perform operations corresponding to any of the methods of embodiments A1-A7.

C4. A computer program product comprising computer-executable instructions that, when executed by processing circuitry of a centralized unit (CU) configured for operation in an integrated access backhaul (IAB) network, configure the CU to perform operations corresponding to any of the methods of embodiments A1-A7.

D1. An intermediate node configured for operation in an integrated access backhaul (IAB) network, the intermediate node comprising:
  radio interface circuitry configured to communicate with a centralized unit (CU) and one or more other IAB nodes; and
  processing circuitry operably coupled to the radio interface circuitry, whereby the processing circuitry and radio interface circuitry are configured to perform operations corresponding to any of the methods of embodiments B1-B6.

D2. An intermediate node configured for operation in an integrated access backhaul (IAB) network, the intermediate node being further arranged to perform operations corresponding to any of the methods of embodiments B1-B6.

D3. A non-transitory, computer-readable medium storing computer-executable instructions that, when executed by processing circuitry of an intermediate node configured for operation in an integrated access backhaul (IAB) network, configure the intermediate node to perform operations corresponding to any of the methods of embodiments B1-B6.

D4. A computer program product comprising computer-executable instructions that, when executed by processing circuitry of an intermediate node configured for operation in an integrated access backhaul (IAB) network, configure the intermediate node to perform operations corresponding to any of the methods of embodiments B1-B6.

The invention claimed is:

1. A method performed by a centralized unit (CU) in an integrated access backhaul (IAB) network, the method comprising:
  determining a first identifier of a first backhaul radio link control (BH RLC) channel between first and second nodes in the IAB network, wherein the second node is a child node of the first node; and
  sending, to the second node, a second request to setup a second BH RLC channel between the second node and a third node in the IAB network, wherein:
    the third node is a child node of the second node; and
    the second request includes the first identifier for association with the second BH RLC channel.

2. The method of claim 1, wherein at least one data radio bearer (DRB) between a user equipment (UE) and the CU is associated with the first BH RLC channel and with the second BH RLC channel.

3. The method of claim 1, wherein:
  the second request is a context setup request or context modification request associated with the UE; and
  the first identifier is a logical channel identifier (LCID).

4. The method of claim 1, further comprising sending, to the first node, a first request to setup the first BH RLC channel.

5. The method of claim 4, wherein determining the first identifier comprises receiving the first identifier from the first node in response to the first request.

6. The method of claim 4, wherein:
  the first identifier is received from a distributed unit (DU) associated with the first node; and
  the second request is sent to a DU associated with the second node.

7. The method of claim 4, wherein:
  the first request includes the first identifier; and
  determining the first identifier comprises selecting the first identifier according to one of the following:
    from a pool of available BH RLC identifiers;
    same as an identifier of a further BH RLC channel, wherein the further BH RLC channel and the first BH RLC channel are associated with the same data radio bearer (DRB) between a user equipment (UE) and the CU; or
    based on quality-of-service (QoS) parameters associated with the first BH RLC channel.

8. The method of claim 7, wherein the second request is sent to the second node without waiting for a response from the first node to the first request.

9. The method of claim 1, further comprising:
  determining a second identifier of the second BH RLC channel; and
  sending, to the third node, a third request to setup a third BH RLC channel between the third node and a fourth node in the IAB network, wherein:
    the fourth node is a child node of the third node; and
    the third request includes the second identifier for association with the third BH RLC channel.

10. The method of claim 9, wherein determining the second identifier comprises receiving the second identifier from the second node in response to the second request.

11. The method of claim 9, wherein:
  the second request includes the second identifier; and
  determining the second identifier comprises selecting the second identifier according to one of the following:
    from a pool of available BH RLC identifiers;
    same as the first identifier;

same as an identifier of a further BH RLC channel, wherein the further BH RLC
channel and the second BH RLC channel are associated with the same data radio bearer (DRB) between a user equipment (UE) and the CU; or
based on quality-of-service (QoS) parameters associated with the second BH RLC channel.

12. A centralized unit (CU) configured to operate in an integrated access backhaul (IAB) network, the CU comprising:
communication interface circuitry configured to communicate with one or more nodes in the IAB network; and
processing circuitry operably coupled to the communication interface circuitry, whereby the processing circuitry and communication interface circuitry are configured to perform operations corresponding to the method of claim 1.

13. A non-transitory, computer-readable medium storing computer-executable instructions that, when executed by processing circuitry of a centralized unit (CU) configured to operate in an integrated access backhaul (IAB) network, configure the CU to perform operations corresponding to the method of claim 1.

14. A method performed by an intermediate node in an integrated access backhaul (IAB) network, the method comprising:
receiving, from a centralized unit (CU) in the IAB network, a request to setup a second radio link control (BH RLC) channel between the intermediate node and a child node in the IAB network, wherein the request includes a first identifier of a first BH RLC channel between the intermediate node and a parent node in the IAB network;
assigning a second identifier to the second BH RLC channel between the intermediate node and the child node in the IAB network; and
associating the first identifier and the second identifier with a data radio bearer (DRB) between a user equipment (UE) and the CU.

15. The method of claim 14, further comprising:
receiving a data packet, associated with the DRB, via one of the first and second BH RLC channels; and
based on associating the first and second identifiers with the DRB, forwarding the data packet for transmission via the other of the first and second BH RLC channels.

16. The method of claim 15, wherein:
the intermediate node includes a mobile terminal (MT) part and a distributed unit (DU) part;
the data packet is received by one of the MT and DU parts; and
the data packet is forwarded for transmission by the other of the MT and DU parts.

17. The method of claim 14, wherein:
the request is a context setup request or context modification request associated with the UE; and
the first identifier is a logical channel identifier (LCID).

18. The method of claim 14, wherein assigning the second identifier to the second BH RLC channel comprises receiving the second identifier in the request to setup the second BH RLC channel.

19. The method of claim 14, wherein assigning the second identifier to the second BH RLC channel comprises selecting the second identifier according to one of the following:
from a pool of available BH RLC identifiers;
same as the first identifier;
same as an identifier of a further BH RLC channel associated with the DRB; or
based on quality-of-service (QoS) parameters associated with the second BH RLC channel.

20. The method of claim 19, further comprising sending, to the CU, a response to the request to setup the second BH RLC channel, wherein the response includes the second identifier.

21. A network node configured to operate as an intermediate node in an integrated access backhaul (IAB) network, the network node comprising:
radio interface circuitry configured to communicate with a centralized unit (CU) and with one or more other IAB nodes; and
processing circuitry operably coupled to the radio interface circuitry, whereby the processing circuitry and radio interface circuitry are configured to perform operations corresponding to the method of claim 14.

22. A non-transitory, computer-readable medium storing computer-executable instructions that, when executed by processing circuitry of a network node configured to operate as an intermediate node in an integrated access backhaul (IAB) network, configure the network node to perform operations corresponding to the method of claim 14.

* * * * *